US007794665B2

(12) United States Patent
Weng

(10) Patent No.: US 7,794,665 B2
(45) Date of Patent: Sep. 14, 2010

(54) FLUIDIC DEVICE

(75) Inventor: Kuo-Yao Weng, Hsin Chu (TW)

(73) Assignee: Industrial Technology Research Institute, Hsinchu (TW)

( * ) Notice: Subject to any disclaimer, the term of this patent is extended or adjusted under 35 U.S.C. 154(b) by 938 days.

(21) Appl. No.: 11/612,882

(22) Filed: Dec. 19, 2006

(65) Prior Publication Data

US 2008/0035499 A1 Feb. 14, 2008

Related U.S. Application Data

(60) Provisional application No. 60/831,285, filed on Jul. 17, 2006.

(51) Int. Cl.
*G05D 9/00* (2006.01)

(52) U.S. Cl. ....................... 422/103; 422/110; 206/532; 206/538

(58) Field of Classification Search ................. 422/103, 422/110; 206/532, 538
See application file for complete search history.

(56) References Cited

U.S. PATENT DOCUMENTS

| | | | |
|---|---|---|---|
| 4,705,464 | A | 11/1987 | Arimond |
| 5,458,852 | A | 10/1995 | Buechler |
| 5,741,125 | A | 4/1998 | Neftel et al. |
| 5,885,527 | A | 3/1999 | Buechler |
| 6,019,944 | A | 2/2000 | Buechler |
| 6,143,576 | A | 11/2000 | Buechler |
| 6,156,270 | A | 12/2000 | Buechler |
| 6,203,296 | B1 | 3/2001 | Ray et al. |
| 6,271,040 | B1 | 8/2001 | Buechler |
| 6,408,884 | B1 | 6/2002 | Kamholz et al. |
| 6,415,821 | B2 | 7/2002 | Kamholz et al. |
| 6,436,722 | B1 | 8/2002 | Clark et al. |
| 6,488,896 | B2 | 12/2002 | Weigl et al. |
| 6,499,515 | B2 | 12/2002 | Sander |

(Continued)

FOREIGN PATENT DOCUMENTS

| | | |
|---|---|---|
| WO | WO01/26813 | 4/2001 |

(Continued)

OTHER PUBLICATIONS

Liu, et al., "Single-use, Thermally Actuated Paraffin Valves for Microfluidic Applications", *Sensors and Actuators B 98*, pp. 328-336 (2004).

(Continued)

*Primary Examiner*—Jill Warden
*Assistant Examiner*—Timothy G Kingan
(74) *Attorney, Agent, or Firm*—Jianq Chyun IP Office

(57) ABSTRACT

A fluidic device includes a first material defining a first region, a second material defining a second region that is separated from the first region, and a connector coupled between the first region and the second region. The connector includes a brittle material and has an open end and a closed end, the open end being disposed in the second region, the closed end being disposed in the first region. The first region is closed off from the second region by the closed end of the connector. The connector is configured such that when the closed end of the connector is broken, the connector defines a passage from the first region to the second region.

16 Claims, 22 Drawing Sheets

U.S. PATENT DOCUMENTS

| | | | | |
|---|---|---|---|---|
| 6,521,188 | B1 | 2/2003 | Webster | |
| 6,527,003 | B1 | 3/2003 | Webster | |
| 6,561,224 | B1 | 5/2003 | Cho | |
| 6,599,098 | B2 | 7/2003 | Weng et al. | |
| 6,644,944 | B2 | 11/2003 | Karp | |
| 6,756,018 | B2 | 6/2004 | Nishimura et al. | |
| 6,767,510 | B1 | 7/2004 | Buechler | |
| 6,782,746 | B1 | 8/2004 | Hasselbrink, Jr. et al. | |
| 6,793,753 | B2 | 9/2004 | Unger et al. | |
| 6,802,342 | B2 | 10/2004 | Fernandes et al. | |
| 6,810,713 | B2 | 11/2004 | Hahn et al. | |
| 6,899,137 | B2 | 5/2005 | Unger et al. | |
| 6,905,882 | B2 | 6/2005 | Buechler et al. | |
| 6,929,030 | B2 | 8/2005 | Unger et al. | |
| 6,929,239 | B1 | 8/2005 | Colin et al. | |
| 6,934,435 | B2 | 8/2005 | Kane | |
| 6,953,058 | B2 | 10/2005 | Fernandes et al. | |
| 2002/0155010 | A1 | 10/2002 | Karp et al. | |
| 2003/0025129 | A1 | 2/2003 | Hahn et al. | |
| 2003/0116738 | A1 | 6/2003 | O'Connor et al. | |
| 2003/0175162 | A1 | 9/2003 | Anazawa et al. | |
| 2004/0132218 | A1 | 7/2004 | Ho | |
| 2005/0084203 | A1 | 4/2005 | Kane | |
| 2005/0130292 | A1 | 6/2005 | Ahn et al. | |
| 2005/0196779 | A1 | 9/2005 | Ho et al. | |
| 2005/0221281 | A1 | 10/2005 | Ho | |
| 2005/0272169 | A1 | 12/2005 | Griffin et al. | |
| 2006/0093528 | A1 * | 5/2006 | Banerjee et al. | 422/103 |

FOREIGN PATENT DOCUMENTS

| | | |
|---|---|---|
| WO | WO01/45613 | 6/2001 |
| WO | WO02/103371 | 12/2002 |
| WO | WO03/026798 | 4/2003 |
| WO | WO 03/049860 | 6/2003 |
| WO | WO 2004/062804 | 7/2004 |

OTHER PUBLICATIONS

Gui, et al., "Ice Valve for a Mini/Micro Flow Channel", *J. Micromech. Microeng*., vol. 14, pp. 242-246 (2004).

Hartshorne, et al., "Ferrofluid-based Microchip Pump and Valve", *Sensors and Actuators B*, vol. 99, pp. 592-600 (2004).

Rogge, et al., "Polymer Micro Valve with a Hydraulic Piezo-Drive Fabricated by the AMANDA Process", *Sensors and Actuators A*, vol. 110, pp. 206-212 (2004).

Lee, et al., "Microfluidic Valve with Colored Glass Microneedle for Microinjection", *Lab Chip*, vol. 3, pp. 164-167 (2003).

Shomburg, et al., "AMANDA—Surface Micromachining, Molding, and Diaphragm Transfer", *Sensors and Actuators*, vol. 76, pp. 343-348 (1999).

Shomburg, et al., "AMANDA—Low-Cost Production of Microfluidic Devices", *Sensors and Actuators A*, vol. 70, pp. 153-158 (1998).

Go, et al., "A Disposable, Dead Volume-Free and Leak-Free Monolithic PDMS Microvalve", *The 12th Int'l Conf. on Solid State Sensors, Actuators and Microsystems*, pp. 643-646 (Boston-Jun. 8-12, 2003).

Go et al., "A Disposable, Dead Volume-Free and Leak-Free In-Plane PDMS Microvalve", *Sensors and Actuators A*, vol. 114, pp. 438-444 (2004).

Guerin et al., "Miniature One-Shot Valve", *Proc. 11th Ann. Int'l Workshop on Micro Electro Mechanical Systems*, pp. 425-428 (1998).

Song et al., "Thermo-pneumatic, Single-stroke Micropump", *J. Micromech. Microeng*., vol. 15, pp. 1425-1432 (2005).

Laser et al., "A Review of Micropumps", *J. of Micromech. Microeng*., vol. 14, pp. R35-R64 (2004).

Ahn et al., "Disposable Smart Lab on a Chip for Point-of-Care Clinical Diagnostics", *Proc. of the IEEE*, 92(1), pp. 154-173 (2004).

Puntambekar et al., "Smart Disposable Plastic Lab-On-A-Chip for Point-of-Care Testing (POCT)", *7th Int'l Conf. on Miniaturized Chemical and Biochemical Analysis Systems*, pp. 1291-1294 (2003).

Rossi et al., "Design, Fabrication and Modeling of Solid Propellant Microrocket-Application to Micropropulsion", *Sensors and Actuators A*, vol. 99, pp. 125-133 (2002).

Kang et al., "High-Impulse, Low-Power, Digital Microthrusters Using Low Boiling Temperature Liquid Propellant with High Viscosity Fluid Plug", *Sensors and Actuators A*, vol. 97-98, pp. 659-664 (2002).

Oh et al., "A Review of Microvalves", *J. Micromech. Microeng*., vol. 16, pp. R13-R39 (2006).

Griss et al., "Expandable Microspheres for the Handling of Liquids", *Lab Chip*, vol. 2, pp. 117-120 (2002).

Pal et al., "Self-Contained Actuation of Phase-Change Pistons in Microchannels", *J. Micromech. Microeng*., vol. 16, pp. 786-793 (2006).

Pal et al., "Phase Change Microvalve for Integrated Devices", *Analytical Chem*., 76(13), pp. 3740-3748 (2004).

Luo et al., "Monolithic Valves for Microfluidic Chips Based on Thermoresponsive Polymer Gels", *Electrophoresis*, vol. 24, pp. 3694-3702 (2003).

Baldi et al., "A Hydrogel-Actuated Environmentally Sensitive Microvalve for Active Flow Control", *J. Microelectromech. Sys*., vol. 12, No. 5, pp. 613-621 (2003).

Beebe et al., "Functional Hydrogel Structures for Autonomous Flow Control Inside Microfluidic Channels", *Nature*, vol. 404, pp. 588-590 (2000).

Eddington et al., "An Organic Self-Regulating Microfluidic System", *Lab on a Chip*, vol. 1, pp. 96-99 (2001).

Terray et al., "Microfluidic Control Using Colloidal Devices", *Science*, vol. 296, pp. 1841-1844 (2002).

Hosokawa et al., "Power-Free Sequential Injection for Microchip Immunoassay Toward Point-of-Care Testing", *Lab Chip*, vol. 6, pp. 236-241 (2006).

Hasselbrink, Jr. et al., "High-Pressure Microfluidic Control in Lab-On-a-Chip Devices Using Mobile Polymer Monoliths", *Analytical Chem*., 74(19), pp. 4913-4918 (2002).

Hong et al., "Disposable Air-Bursting Detonators as an Alternative On-Chip Power Source", *The 15th Int'l. IEEE Conf. on Micro Electro Mechanical Systems*, pp. 240-243 (2002).

Hong et al., "A Functional On-Chip Pressure Generator Using Solid Chemical Propellant for Disposable Lab-On-a-Chip", *The 16th Ann. Int'l Conf. on Micro Electro Mechanical Systems / IEEE*, pp. 16-19 (2003).

Rossi et al., "Pyrotechnic Actuator: A New Generation of Si Integrated Actuator", *Sensors and Actuators*, vol. 74, pp. 211-215 (1999).

Ringuette et al., "On the Optimization of GAP-Based Ducted Rocket Fuels from Gas Generator Exhaust Characterization", *Propellants, Explosives, Pyrotechnics*, vol. 26, pp. 118-124 (2001).

Hansen et al., "A Robust and Scalable Microfluidic Metering Method that Allows Protein Crystal Growth by Free Interface Diffusion", *PNAS*, 99(26), pp. 16531-16536 (2002).

Unger et al., "Monolithic Microfabricated Valves and Pumps by Multilayer Soft Lithography", *Science*, vol. 288, pp. 113-116 (2000).

Zoval et al., "Centrifuge-Based Fluidic Platforms", *Proc. IEEE*, 92(1), pp. 140-153 (2004).

* cited by examiner

TABLE-1

| Candidate Thermolytic Body | Decomposition Temperature (°C.) | Major Decomposition |
|---|---|---|
| Ammonium Dicarbonate $(NH_4)CO_3$ | 60 | $NH_3$, $CO_2$, $H_2O$ |
| Sodium Dicarbonate $(NaHCO_3)$ | 100-140 | $CO_2$, $H_2O$ |
| Sodium Borohydride $(NaBH_4)$ | 300 | $CO_2$,$H_2O$ |
| Azobisisobutyronitrile (AZDN) $(CH_3)_2(CN)C{-}N{=}N{-}C(CN)(CH_3)_2$ | 105 | $N_2$ |
| N,N'-Dimethy-N,N' Dinitroso-terephthalamide $(C_6H_4){-}[Con(CH_3){-}NO]_2$ | 118 | $N_2$ |
| 4,4'-Oxybis (Benzenesulfonhydrazide) (OBSH) | 164 | $N_2$ |
| 3,3'-Sulfonbis(Benzene-Sulfonylhydrazide) (D-33) $SO_2(C_6H_4SO_2NH{-}NH_2)_2$ | 148 | $N_2$ |
| N,N'-Dinitroso Pentamethylene Tetramine (DTP) Other Organic Foaming Agents | 195 | $N_2$ |

FIG. 4B

FLUIDIC DEVICE

CROSS REFERENCE TO RELATED APPLICATIONS

The application claims priority to U.S. Provisional Application Ser. No. 60/831,285, filed Jul. 17, 2006. This application is related to concurrently filed U.S. patent application Ser. No. 11/612,869, filed on Dec. 19, 2006, entitled "Fluidic Device", and U.S. patent application Ser. No. 11/612,896, filed on Dec. 19, 2006, entitled "Fluidic Device". The above applications are all incorporated by reference.

BACKGROUND OF THE INVENTION

The description relates to fluidic devices.

Many types of testing devices can be used in detecting the presence of compounds or analyzing bio-chemical reactions. For example, lateral flow assays can be performed using a lateral flow membrane having one or more test lines along its length. A fluid with dissolved reagents travels from one end of the membrane to the test lines by electro osmosis. A reader detects whether reaction occurred at the test lines, which indicate the presence or absence of certain particles in the reagents. As another example, a device with an array of micro capillaries can be used to control the How of fluids in immunoassay processes. Reagents are positioned at various locations along the lengths of the micro capillaries so that as fluids flow in the micro capillaries due to capillary force, the fluids come into contact with the reagents. A reader monitors the sites where the reagents are located to determine whether reactions have occurred. As yet another example, micro fluidic chips can be used to perform assays by controlling the flow of fluids through various channels and chambers. The micro fluidic chips are used with an external power supply and/or pump that provide the driving force for moving the fluids.

SUMMARY

In one aspect, in general, a fluidic device includes a first material defining a first region, a second material defining a second region that is separated from the first region, and a connector coupled between the first region and the second region. The connector includes a brittle material and has an open end and a closed end, the open end being disposed in the second region, the closed end being disposed in the first region, the first region being closed off from the second region by the closed end of the connector. The connector is configured such that when the closed end of the connector is broken, the connector defines a passage from the first region to the second region.

Implementations of the fluidic device can include one or more of the following features. The first region includes a channel and a reservoir, in which the channel is configured to draw fluid from the reservoir into the channel due to a capillary force after the connector is broken. The connector includes an outer perimeter having a portion that has a fiat surface, and an inner perimeter having a portion that has a flat surface, to allow light to illuminate a fluid in the connector. The connector includes a material having a volume that does not block a passage of a fluid prior to absorption of the fluid, in which the material expands in volume upon absorption of a portion of the fluid such that, after expansion, the material blocks passage of additional fluid through the connector. The first material includes a flexible material that allows application of an external force to break the closed end of the connector.

In another aspect, in general, a fluidic device includes a self-close valve having a channel and a material disposed in the channel, in which the material has a volume that does not block a passage of a fluid prior to absorption of the fluid, and the material expands in volume upon absorption of a portion of the fluid such that after expansion, the material blocks passage of additional fluid through the channel.

Implementations of the fluidic device can include one or more of the following features. The material includes superabsorbent polymers. The channel includes an expanded section having a larger diameter than adjacent portions of the channel, and the material is disposed in the expanded section. The channel includes a capillary, and the fluid moves in the channel at least in part due to a capillary force. The fluidic device includes a broken open, valve having an open end and a closed end, the open end being coupled to the self-close valve, the closed end preventing passage of a fluid when intact and allowing passage of the fluid when broken. The fluidic device includes a second channel, in which the self-close valve and the broken open valve are positioned in the second channel, the second channel having a wall that includes a flexible material that allows application of an external force to break the closed end of the broken open valve.

In another aspect, in general, a method includes enabling a fluid to flow in a channel coupled to a broken open valve that includes a connector having an open end and a closed end, the connector positioned between a first region and a second region, the first region being closed off from the second region by the closed end of the connector when the valve is intact. To enable the fluid to flow, the closed end of the connector is broken to form a passage from the first region to the second region through the connector. The method includes absorbing a portion of the fluid flowing in the channel by using a material that expands in volume after absorbing the fluid, and using the expanded material to block further flow of additional fluid through the connector.

Implementations of the method can include one or more of the following features. The material includes superabsorbent polymers.

In another aspect, in general, a method includes flowing a fluid in a channel that includes a material that expands in volume upon absorption of a portion of the fluid, including flowing a first portion of the fluid past the material and using the material to absorb a second portion of the fluid, causing the material to expand in volume, and blocking passage of additional fluid through the channel by using the expanded material.

Implementations of the method can include one or more of the following features. The method can include breaking a closed end of a connector to enable passage of additional fluid in the channel by flowing the fluid through the connector to bypass the expanded material. Prior to breaking the closed end, the connector has an open end disposed in a first section of the channel and a closed end disposed in a second section of the channel, the first and second sections being separated by the expanded material. The method can include absorbing a portion of the fluid flowing through the connector by using a material that expands in volume after absorbing the fluid, and using the expanded material to block further flow of additional fluid through the connector. The material can include superabsorbent polymers. The channel can have a wall that includes a flexible material that allows application of an external force to break the closed end of the connector.

In another aspect, in general, a method includes passing a fluid through a channel that includes a first self closing valve and a second self closing valve, the first and second self closing valves spaced apart from each other, each self closing valve includes a fluid absorbing material that expands in volume upon absorption of a portion of the fluid. The method includes absorbing a portion of the fluid by using the fluid absorbing materials in the first and second self closing valves, and expanding the volume of the fluid absorbing materials to block further passage of additional fluid through the channel, retaining a predetermined amount of fluid in a section of the channel between the first and second self closing valves.

Implementations of the method can include one or more of the following features. The method can include drawing the fluid through the channel using a capillary force.

DESCRIPTION OF DRAWINGS

FIG. 4B is a table of materials.

DESCRIPTION

A fluidic device for performing assays can include control components such as vacuum pumps, gas pumps, "broken open valves," and "self-close valves" for controlling the flow of fluids in the fluidic device. The vacuum pump can be used to pull a fluid in a specific direction in a channel, and the gas pump can be used to push a fluid in a specific direction in a channel. The broken open valve can be used to connect two separate regions at the control of a user, and the self-close valve can be used to automatically seal off a channel after passage of a fluid. The vacuum pumps, gas pumps, broken open valves, and self close valves can be made small so that the fluidic device can be made small and portable.

In the following description, the individual control components will be introduced first, followed by a description of how the control components can be combined to construct modular units for controlling fluids in fluidic devices. Afterwards, how biological assays can be performed using the fluidic devices will be described.

Figure 1A:
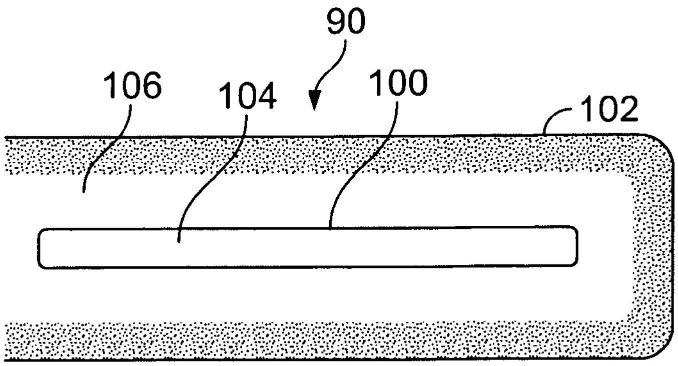
FIGS. 1A and 1B are schematic diagrams of a vacuum pump.

Referring to FIG. 1A, a vacuum pump 90 can be constructed by placing a container 100 in a channel 106 (or chamber) defined by a material 102. The container 100 encloses a region 104 that is vacuum or has a low gas pressure as compared to the gas pressure in the channel 106.

Figure 1B:
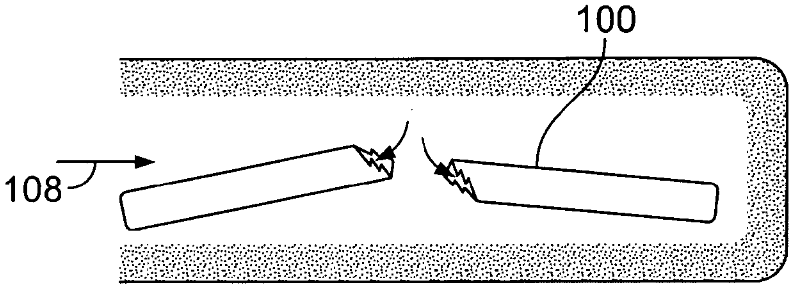

Referring to FIG. 1B, the container 100 can be, e.g., a glass capillary, that breaks upon, application of an external force. When the container 100 breaks, gas in the channel 106 flows into the vacuum region 104, reducing the pressure in the region 106. This produces a suction force that can be used to pull a fluid in a direction 108 towards the region 106.

Figure 25A:
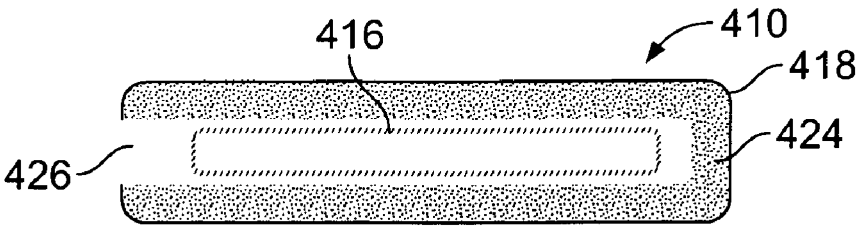
FIGS. 25A to 25C are schematic diagrams of vacuum pumps.
Figure 25B:
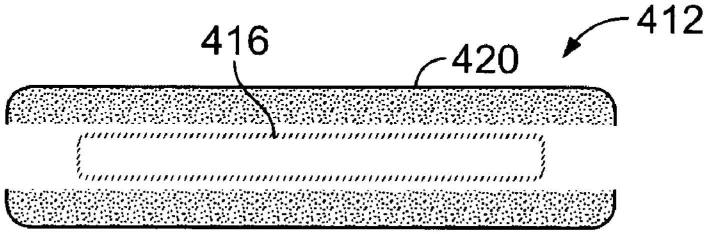
Figure 25C:
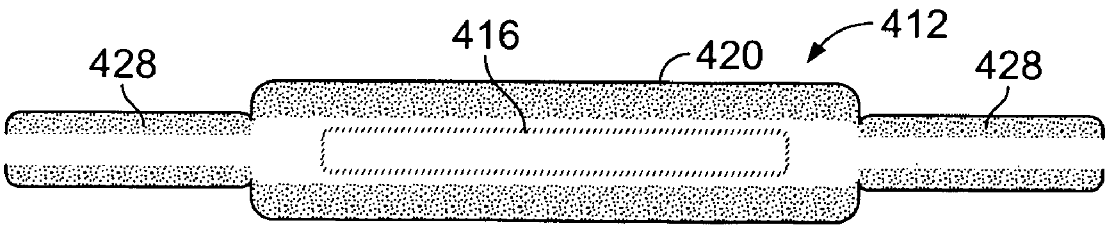

FIGS. 25A to 25C show examples of vacuum pumps using glass capillaries placed in rubber tubes. FIG. 25A shows a cross section of a gas pump 410 having a vacuum glass capillary 416 placed in a rubber tube 418, where the tube 418 has a closed end 424 and an open end 426. FIG. 25B shows a cross section of a gas pump 412 that is similar to the gas pump 410 except that the gas pump 412 has a rubber tube 420 with two open ends. FIG. 25C shows the gas pump 412 connected to two rubber tubes 428, where the rubber tube 420 has a larger inner diameter (to accommodate the glass capillary 416) than the rubber tubes 428.

Figure 26A:
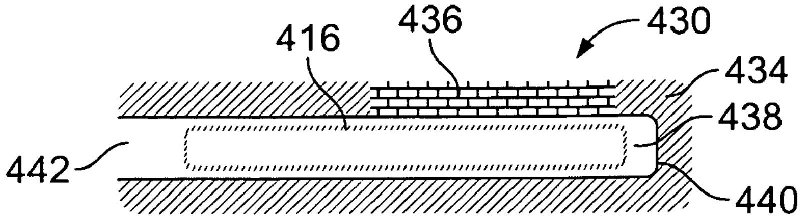
FIGS. 26A and 26B are schematic diagrams of vacuum pumps.
Figure 26B:
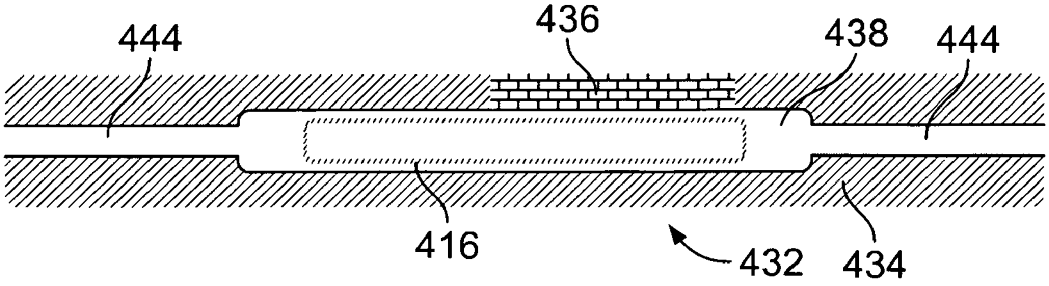

FIGS. 26A and 26B show examples of vacuum pumps using glass capillaries placed in planar fluidic channels. FIG. 26A shows a cross section of a vacuum pump 430 having a vacuum glass capillary 416 placed in a fluidic channel 438 defined by a planar substrate 434. The fluidic channel 438 has a closed end 440 and an open end 442. The planar substrate 434 may be made of a rigid material. An elastic layer 436 is embedded in the substrate 434 at a location adjacent to the capillary 416 to allow a user to apply an external force through the elastic layer to break the capillary 416.

FIG. 26B shows a cross section of a vacuum pump 432 that is similar to the vacuum pump 430 except that the fluidic channel 438 is connected to two fluidic channels 444 having smaller cross sections.

A vacuum glass capillary can be made by heating one end of a glass capillary to melt the glass to form a first closed end. A vacuum pump is used to pump air out of the glass capillary through the open end. The glass capillary is heated at a location at a distance from the first closed end. The heat softens the glass, which can be pinched or twisted to form a second closed end.

Figure 2A:
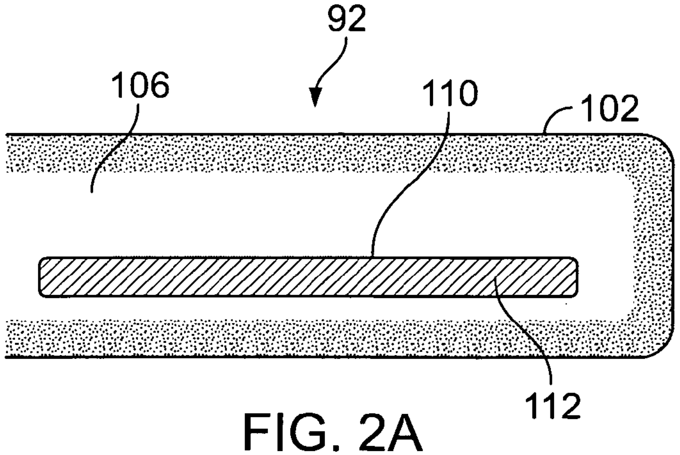
FIGS. 2A and 2B are schematic diagrams of a gas pump.

Referring to FIG. 2A, a gas pump 92 can be constructed by placing a container 110 in a channel 106 (or chamber) defined by a material 102. The container 110 encloses a region 112 that has a higher gas pressure compared to the gas pressure in the channel 106 outside of the container 110.

Figure 2B:
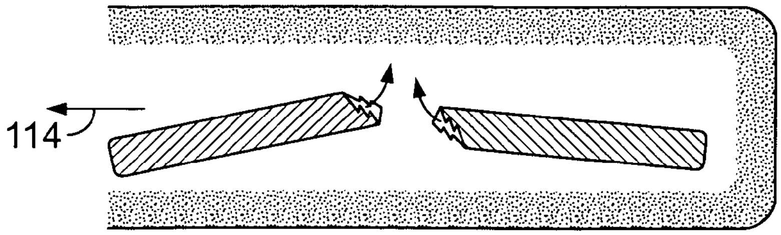

Referring to FIG. 2B, the container 110 can be, e.g., a glass capillary, that breaks upon application of an external force. When the container 110 breaks, gas originally inside the container 110 flows out of the container 110, increasing the pressure in the region 106. This produces a force that can be used to push a fluid in a direction 114 away from the region 106.

In this description, the term "vacuum pump" wall be used to refer generally to a device that generates a pull force that can be used to pull a fluid towards the device, and the term "gas pump" will be used to refer generally to a device that generates a push force that can be used to push a fluid away from the device.

Figure 3A:
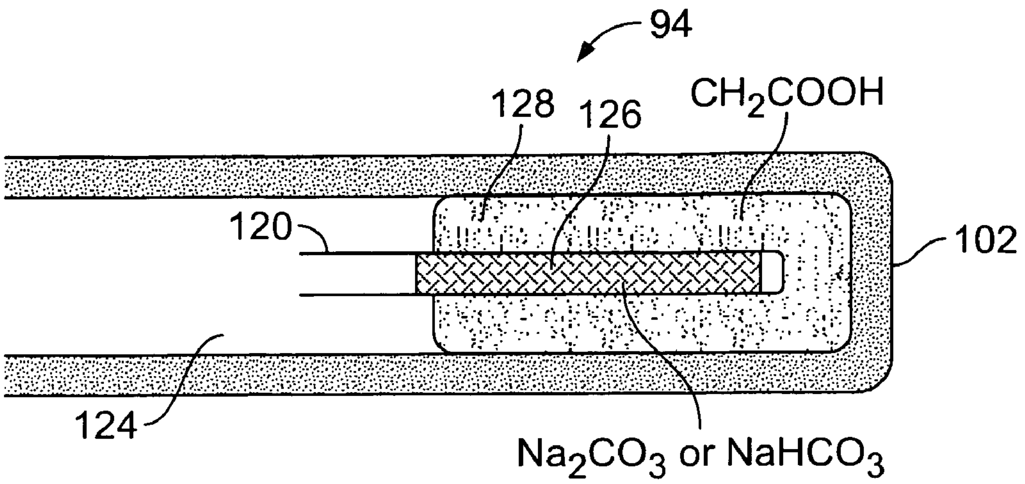
FIGS. 3A and 3B are schematic diagrams of a gas pump.

There are alternative ways to construct a gas pump. For example, referring to FIG. 3A, a gas pump 94 can be fabricated by placing a glass capillary 120 that is partially filled with a first material 126 in a channel 124 (or chamber) that contains a second material 128. The first and second materials 126 and 128 are selected so that when they intermix, the materials 126 and 128 will interact and generate one or more gases. For example, the first material 126 can be disodium carbonate ($Na_2CO_3$) and/or sodium hydrogen carbonate ($NaHCO_3$), and the second material 128 can be ethanoic acid ($CH_2COOH$).

Figure 3B:
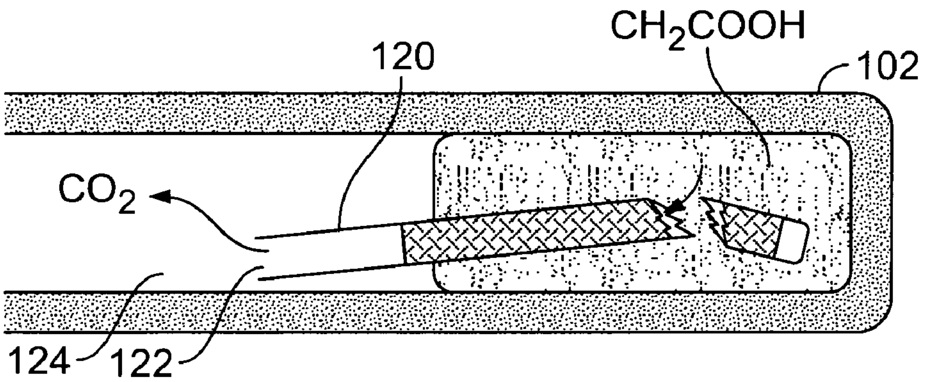

Referring to FIG. 3B, when an external force is applied to break the glass capillary 120, the first and second materials 126 and 128 Interact and generate a gas. In this example, the gas is carbon dioxide (CO2). The chemical reactions that occur are:

$$Na_2CO_3+2CH_2COOH \rightarrow 2NaCOOCH_2+H_2O+CO_2$$

$$NaHCO_3+CH_2COOH \rightarrow NaCOOCH_2+H_2O+CO_2$$

The carbon dioxide increases the pressure in the channel 124, generating a force that can be used to push a fluid away from the broken capillary 120.

Figure 27A:
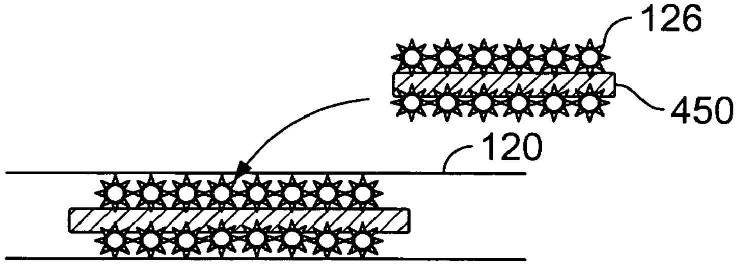
FIGS. 27A to 27C are schematic diagrams of self-close valves.
Figure 27B:
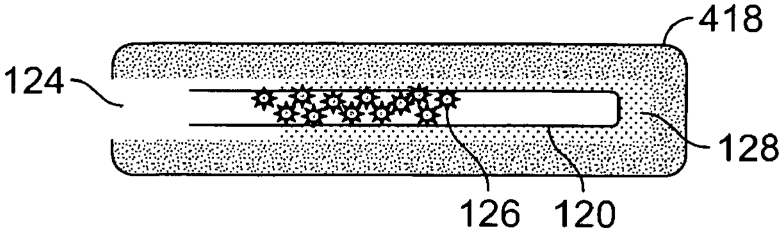
Figure 27C:
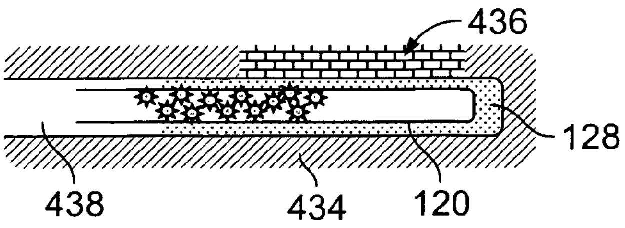

The first material 126 can be filled directly into the capillary 120. Referring to FIG. 27A, the first material 126 can also be attached to a wire 450, then the wire 450 along with the coated material 126 is placed inside the capillary 120. FIG. 27B shows an example in which the glass capillary 120 is placed in a channel 124 within a rubber tube 418. The channel 124 contains a second material 128 that can interact with the first material 126 when the glass capillary 120 is broken. FIG. 27C shows an example in which the glass capillary 120 is placed in a fluidic channel 438 within a planar device substrate 434. An elastic layer 436 is embedded in the substrate 434 at a location adjacent to the capillary 120 to allow a user to apply an external force through the elastic layer 436 to break the capillary 120.

Figure 4A:
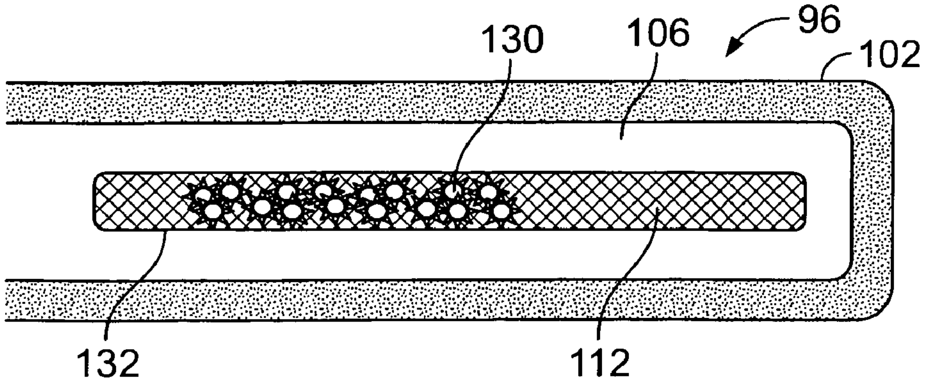
FIG. 4A is a schematic diagram of a gas pump.

Referring to FIG. 4A, a gas pump 96 can be fabricated by placing a compound 130 in a glass capillary 132, sealing the capillary 132, heating the capillary 132, cooling the capillary 132, and placing the capillary 132 in a channel 106 (or chamber). The compound 130 is selected to be a material that generates a gas after being heated. When the capillary 132 is heated and cooled, the gas generated from the compound 130 increases the gas pressure inside the capillary 132, as compared to the gas pressure outside of the capillary 132.

Examples of the compound 130 include sodium dicarbonate ($NaHCO_3$) and calcium carbonate ($CaCO_3$). These compounds generate carbon dioxide when heated:

$$NaHCO_3 \rightarrow NaOH+CO_2$$

$$CaCO_3 \rightarrow CaO+CO_2$$

The compound 130 can also include sodium azide, $NaN_3$, which generates $N_2$ gas by using the thermal decomposition reaction:

$$2NaN_3 43\ 2Na+3N_2.$$

Sublimation materials that change from solid form to gas form (e.g. dry ice that turns into $CO_2$) can also be used. Other materials that generate gas when heated are listed In Table 1 of FIG. 4B.

Figure 5A:
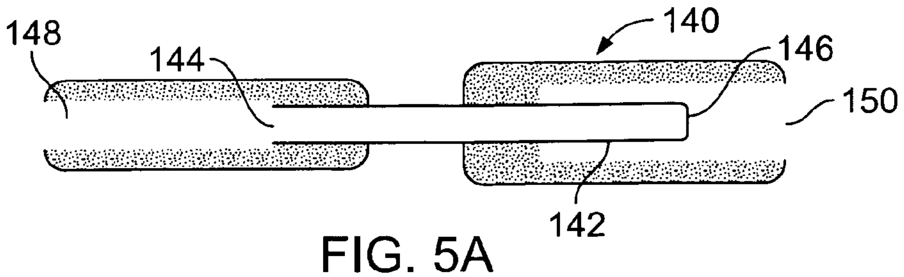
FIGS. 5A and 5B are schematic diagrams of a broken-open valve.

Referring to FIG. 5A, a broken open valve 140 can be fabricated by placing a glass capillary 142 between a first channel 148 and a second channel 150. The glass capillary 142 has an open end 144 that is positioned in the first channel 148, and a closed end 146 that is positioned in the second channel 150. When the glass capillary 142 is intact, fluids cannot flow between the first and second channels 148 and 150. This is referred to as the "closed" state of the broken open valve 140.

Figure 5B:
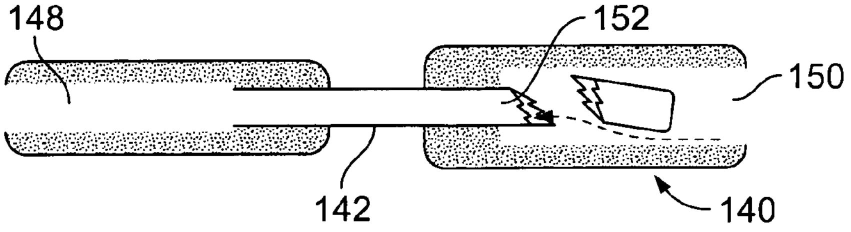

Referring to FIG. 5B, when an external force is applied to break the glass capillary 142, a passage 152 is formed that connects the channels 148 and 150. This is referred to as the "open" state of the broken open valve 140. The broken open valve 140 is useful in allowing two fluids (or a fluid and a solid) to be separated initially, then interact at a time controlled by the user.

Figure 28A:
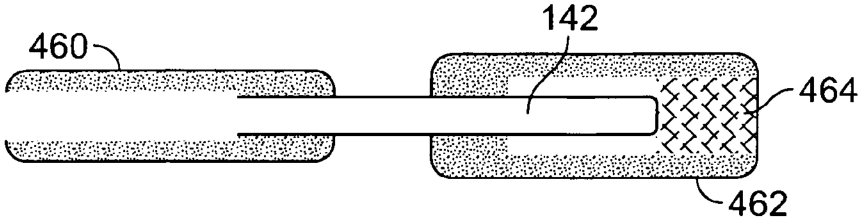
FIGS. 28A and 28B are schematic diagrams of a broken open valve.
Figure 28B:
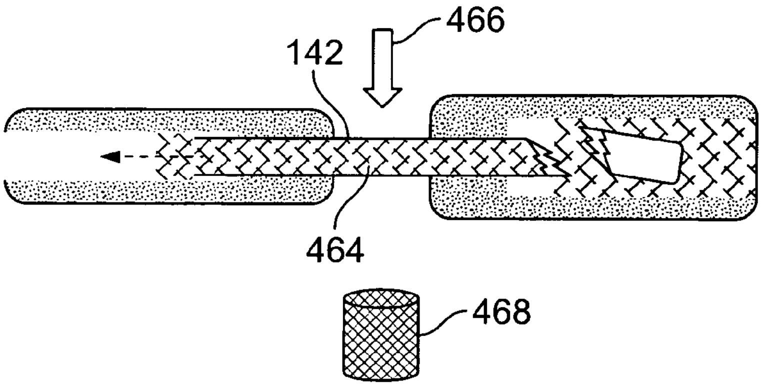

FIGS. 28A and 28B show an example of using a broken-open valve to construct a low cost device for performing an assay in which a fluid is irradiated with ultra-violet (UV) light. A glass capillary 142 connects two plastic channels 460 and 462. Initially, a reactant 464 is contained in the first plastic channel 462. Upon breaking the glass capillary 142, the reactant 464 flows through the glass capillary 142 to the second plastic channel 460. As shown in FIG. 28B, a UV light source 466 irradiates the reactant 464 as it Sows through the glass capillary 142. A detector 468 detects the UV light that passes the reactant 464. The spectrum of the UV light detected by the detector 468 is useful in determining the compounds in the reactant 464.

Figure 28C:
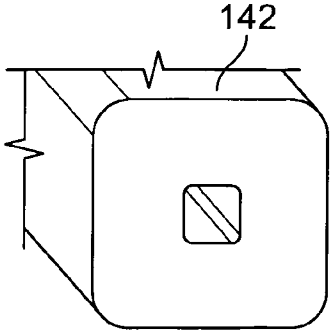
FIG. 28C is a cross section of a glass capillary.

FIG. 28C shows a cross section of a glass capillary having square shaped inner and outer perimeters. The square shaped inner and outer perimeters allow the UV light to pass the glass capillary in a direction that is perpendicular to the surface of the glass capillary. This allows more UV light to reach the fluid in the glass capillary, as compared to a capillary having a circular cross section that may cause the incident UV light to be reflected or redirected in directions away from the fluid. In general, the glass capillary can have a shape with an outer perimeter having portions that have flat surfaces, and an inner perimeter having portions that have flat surfaces, to allow external light to illuminate the fluid in the glass capillary and exit the glass capillary to be detected by a sensor.

Figure 6A:
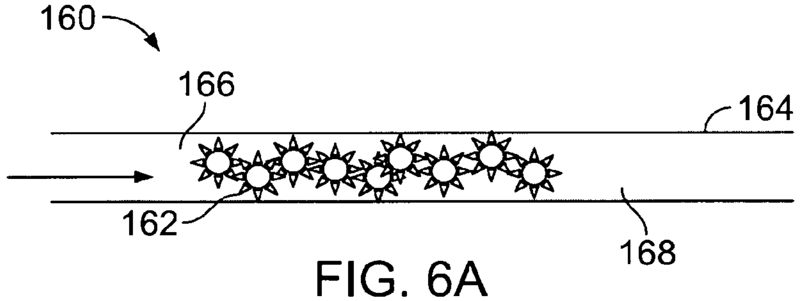
FIGS. 6A, 6B, 7A, 7B, and 8A to 8C are schematic diagrams of self-close valves.
Figure 6B:
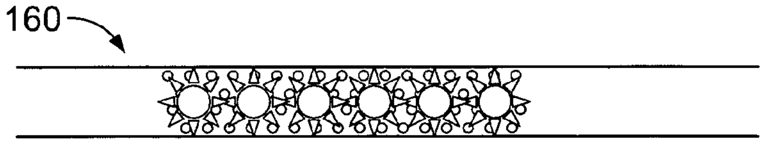

Referring to FIGS. 6A and 6B a self-close valve 160 can be constructed by placing superabsorbent polymers (SAP) 162 in a channel 164. Initially, the SAP 162 has a smaller volume and allows fluids to flow between a first region 166 and a second region 168 in the channel 164 (FIG. 6A). This is referred to as the "open" state of the self-close valve. When a fluid flows past the SAP 162, the SAP absorbs a portion of the fluid and expands in volume, blocking the channel 164 (FIG. 6B), preventing additional fluid from flowing between the first region 166 and the second region 168. This is referred to as the "closed" state of the self-close valve.

Superabsorbent polymers can absorb and retain large volumes of water or other aqueous solutions. In some examples, SAP can be made from chemically modified starch and cellulose and other polymers, such as polyvinyl alcohol) PVA, poly(ethylene oxide) PEO, which are hydrophilic and have a high affinity for water. In some examples, superabsorbent polymers can be made of partially neutralized, lightly cross-linked poly(acrylic acid), which has a good performance versus cost ratio. The polymers can be manufactured at low solids levels, then dried and milled Into granular white solids. In water, the white solids swell to a rubbery gel that in some cases can include water up to 99% by weight.

Figure 7A:
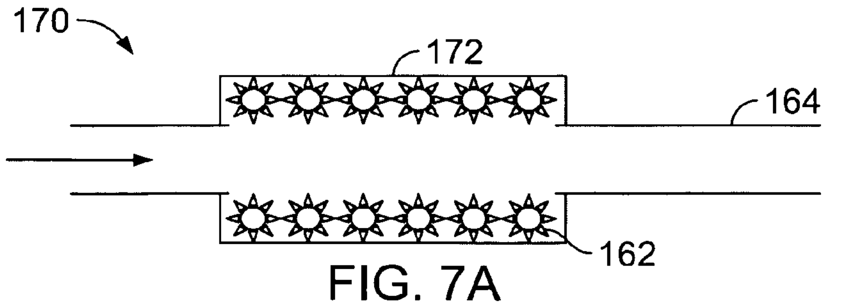

Referring to FIG. 7A, a self-close valve 170 can include a channel 164 that has an enlarged portion 172 to accommodate the superabsorbent polymers 162 so that the superabsorbent polymers 162 do not restrict flow of fluid before expansion of the SAP 162. To fabricate the self-close valve 170, an adhesive can be applied to the inner walls of the enlarged portion 172, the SAP 162 in powder form is then pushed into the channel 164 so that the SAP 162 powder adheres to the inner wall at the enlarged portion 172.

Figure 7B:
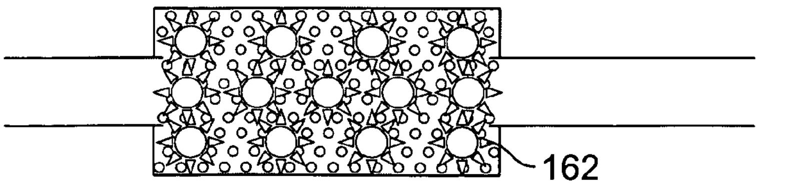

Referring to FIG. 7B, as the fluid flows past the superabsorbent polymers 162, the superabsorbent polymers 162 absorb a portion of the fluid and expands in volume, blocking the channel 164, preventing further flow of the fluid past the expanded polymers 162.

Figure 8A:
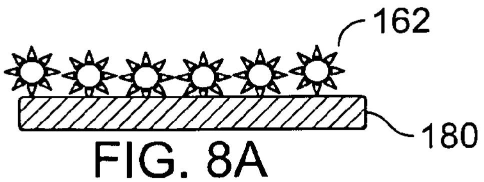
Figure 8B:
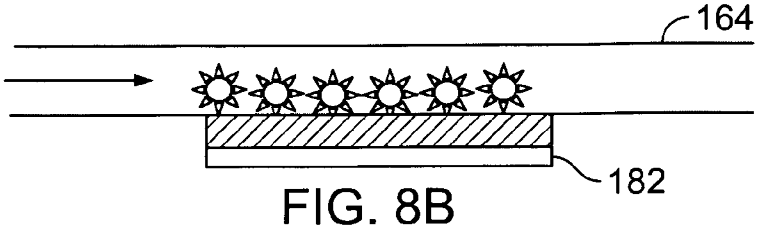

Referring to FIGS. 8A and 8B, superabsorbent polymers 162 can be attached to a wire 180, then placed Into a channel 164. The channel 164 can have a recessed region 182 in which an adhesive is applied to secure the wire 180 at a predefined location.

Figure 8C:
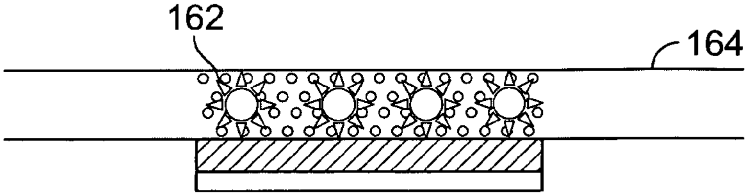

Referring to FIG. 8C, as the fluid flows past the superabsorbent polymers 162, the polymers 162 absorb a portion of the fluid and expands in volume, blocking the channel 164, preventing further flow of the fluid past the expanded polymers 162.

A self-close valve can be constructed by coating a wire with SAP, then placing the coated wire into a channel or tube. A self-close valve for use in a planar fluidic device can be constructed by coating a planar substrate with SAP, then placing the coated substrate into a planar channel in the planar fluidic device.

Figure 9A:
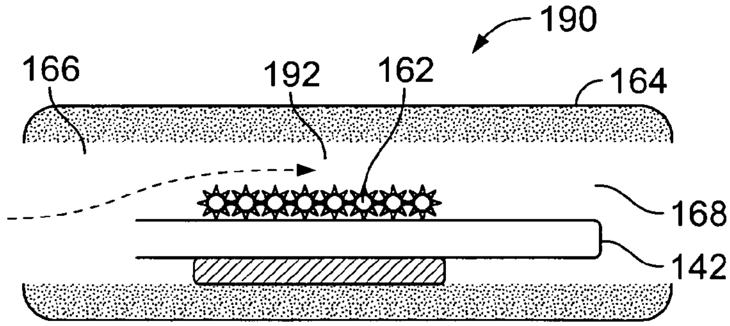
FIGS. 9A to 9C are schematic diagrams of an on-off-on valve.
Figure 9B:
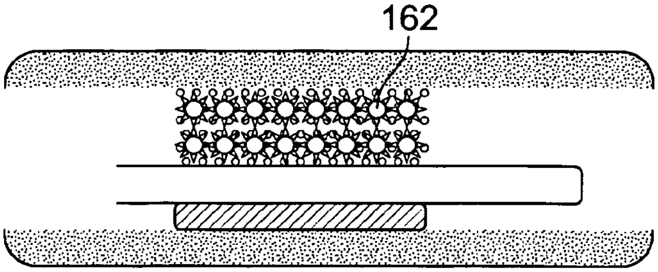
Figure 9C:
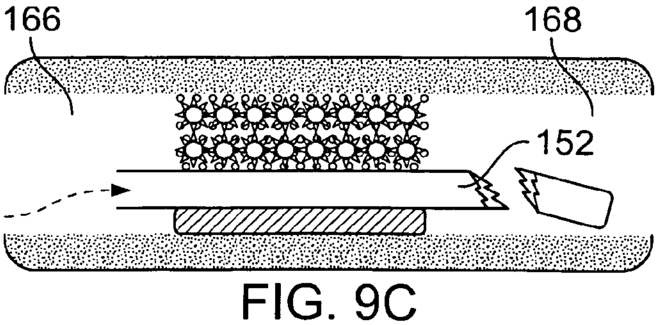

Referring to FIGS. 9A to 9C, an on-off-on valve 190 can be fabricated by using a glass capillary 142 and SAP 162 that are positioned outside of and adjacent to the capillary 142. The capillary 142 and the SAP 162 are both positioned in a channel 164 having a first region 166 and a second region 168. Using the glass capillary 142 and the SAP is similar to using a combination of a broken open valve and a self-close valve. The on-off-on valve 190 enables a user to control the flow of fluids through a particular location in the channel by allowing, then blocking, and then allowing fluids to pass through the particular location.

Referring to FIG. 9A, initially, the SAP 162 has a smaller volume and does not block the channel, allowing a fluid to flow between the first and second regions 166 and 168.

Referring to FIG. 9B, as the fluid passes, a portion of the fluid is absorbed by the SAP 162, causing the SAP 162 to increase in volume, blocking further flow of the fluid between the first and second regions 166 and 168.

Referring to FIG. 9C, when an external force is applied to break the glass capillary 142, a passage 152 is generated to allow the fluid to flow between the first and second regions 166 and 168.

Figure 10A:
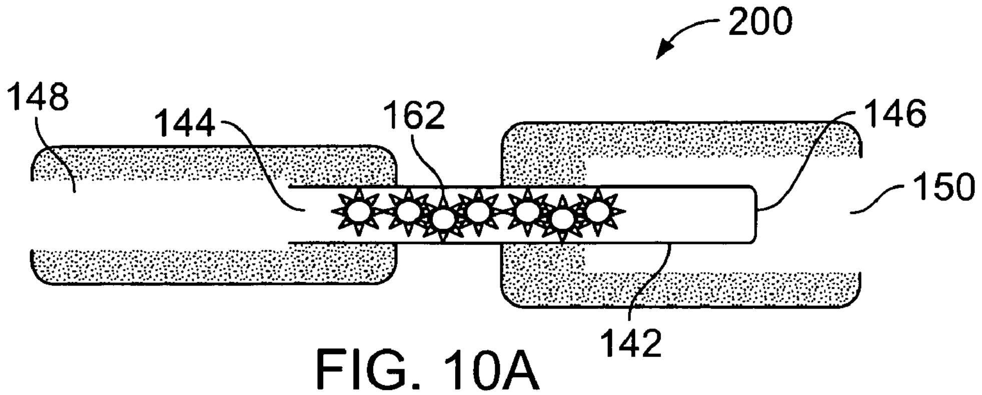
FIGS. 10A to 10C are schematic diagrams of an off-on-off valve.
Figure 10B:
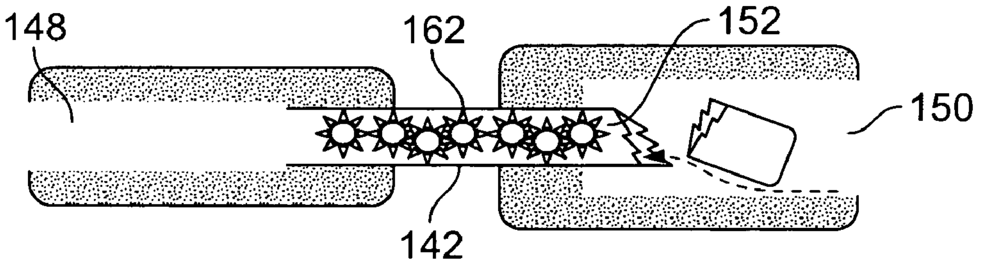
Figure 10C:
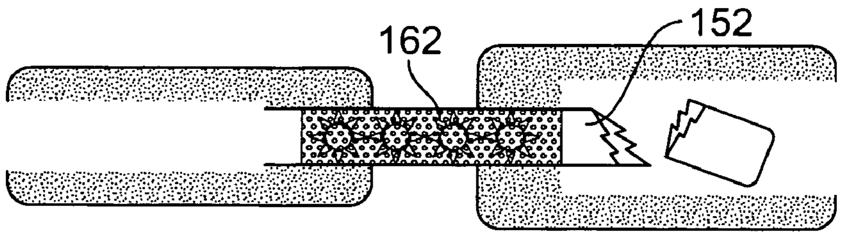

Referring to FIGS. 10A to 10C, an off-on-off valve 200 can be fabricated by using a glass capillary 142 and SAP 162 that are positioned inside the capillary 142. The capillary 142 has an open end 144 and a closed end 146. The open end 144 is positioned in a first channel 148, and the closed end 146 is positioned in a second channel 150. The glass capillary 142 and the SAP 162 perform functions similar to a combination of a broken open valve and a self-close valve. The off-on-off valve 200 enables a user to control the flow of fluids through a particular location in the channel by blocking, then allowing, and then blocking fluids from passing through the particular location.

Referring to FIG. 10A, when the glass capillary 142 is intact, the first and second channels 148 and 150 are not connected.

Referring to FIG. 10B, when an external force is applied to break the glass capillary 142, a passage 152 is formed, allowing fluid to flow between the channels 148 and 150. The SAP 162 initially has a smaller volume and does not block the flow of fluid in the passage 152.

Referring to FIG. 10C, as the fluid flows through the passage 152, a portion of the fluid is absorbed by the SAP 162, causing the SAP to increase in volume and block the passage 152, preventing further flow of the fluid through the passage 152.

Referring to FIGS. 11A to 11D, an on-off-on-off valve can be fabricated by using a glass capillary 142, SAP 212 that are positioned inside the capillary 142, and SAP 214 that are positioned outside of the capillary 142. The glass capillary 142, the SAP 212, and the SAP 214 are placed in a channel 164. The glass capillary 142, the SAP 212, and the SAP 214 perform functions similar to a combination of a broken open valve and two self-close valves. The on-off-on-off valve 210 enables a user to control the flow of fluids through a particular location in the channel by allowing, then blocking, then allowing, and then blocking fluids from passing through the particular location.

Figure 11A:
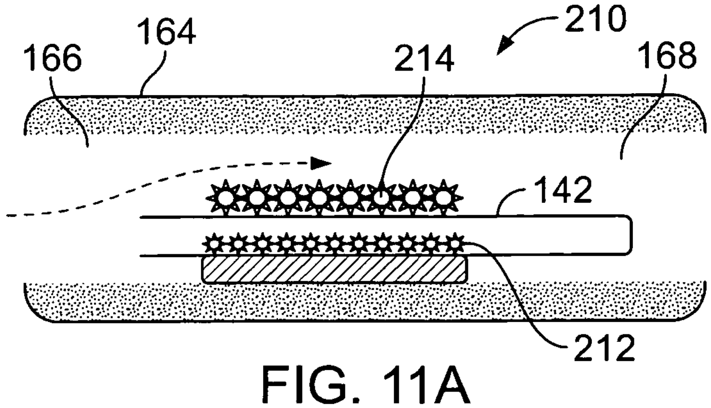
FIGS. 11A to 11D are schematic diagrams of an on-off-on-off valve.

Referring to FIG. 11A, initially, the SAP 214 has a smaller volume and allows a fluid to flow between a first region 166 and a second region 168 of the channel 164.

Figure 11B:
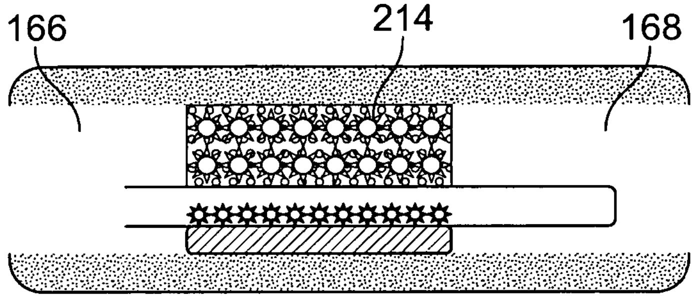

Referring to FIG. 11B, as fluid passes, a portion of the fluid is absorbed by the SAP 214, causing the SAP 214 to increase in volume, blocking further flow of the fluid between the first and second regions 166 and 168.

Figure 11C:
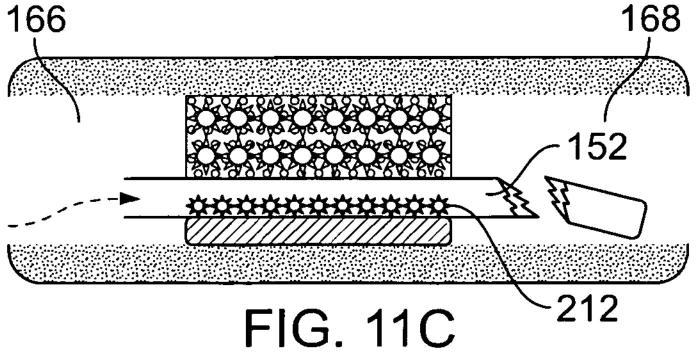

Referring to FIG. 11C, when an external force is applied to break the glass capillary 142, a passage 152 is formed to allow fluids to flow between the first and second regions 166 and 168.

Figure 11D:
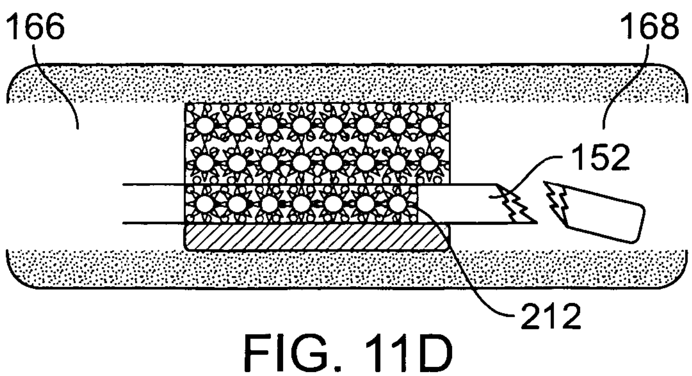

Referring to FIG. 11D, as the fluid flows pass the SAP 212, a portion of the fluid is absorbed by the SAP 212, causing the SAP 212 to increase in volume and block the passage 152, preventing further flow of fluids through the passage 152.

Figure 12:
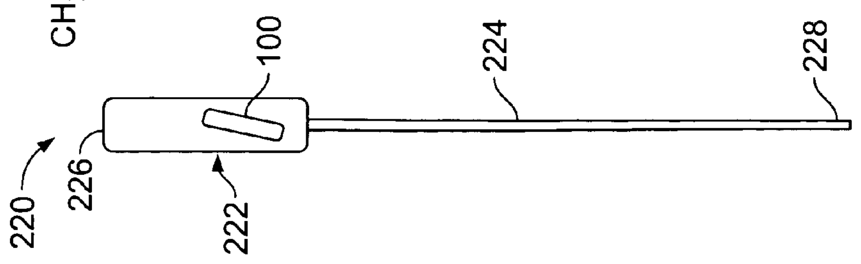
FIG. 12 is a schematic diagram of a metering pipette.

Referring to FIG. 12, a metering pipette 220 for drawing a predetermined amount of fluid can be constructed by using a vacuum pump 222 coupled to a pipette tube 224. The vacuum pump 222 includes a vacuum glass capillary 100 that is placed in a pipette bulb 226. To use the metering pipette 220, the glass capillary 100 is broken to generate a suction force that draws a fluid into the pipette tube 224.

When a batch of metering pipettes 220 are manufactured, the sizes of the bulb 226 and the glass capillary 100 can be made to be the same. The bulb 226 and the glass capillary 100 are designed so that when the user presses the bulb 226 to break the glass capillary 100, the amount of deformation imparted on the bulb 226 that is required to cause the glass capillary 100 to be broken is substantially the same for all the metering pipettes 220. This way, a user can use the metering pipette 220 to quickly draw in a predetermined amount of fluid without monitoring the fluid level in the stem 224.

Figure 21A:
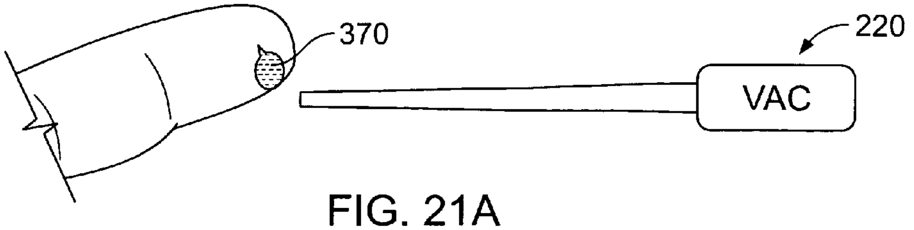
FIGS. 21A and 21B show a metering pipette being used to sample blood from a patient.
Figure 21B:
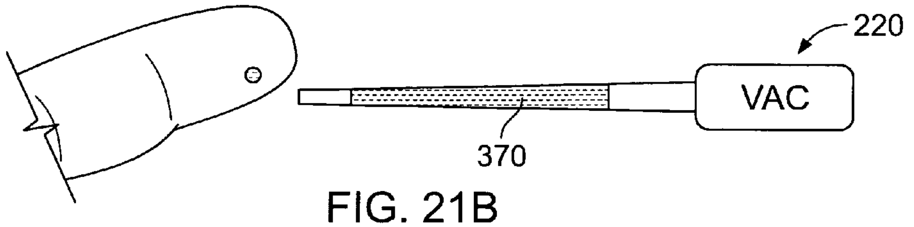

For example, ret erring to FIGS. 21A and 21B, a metering pipette 220 can be used to quickly sample a predetermined amount of blood 370 from a patient.

Figure 13:
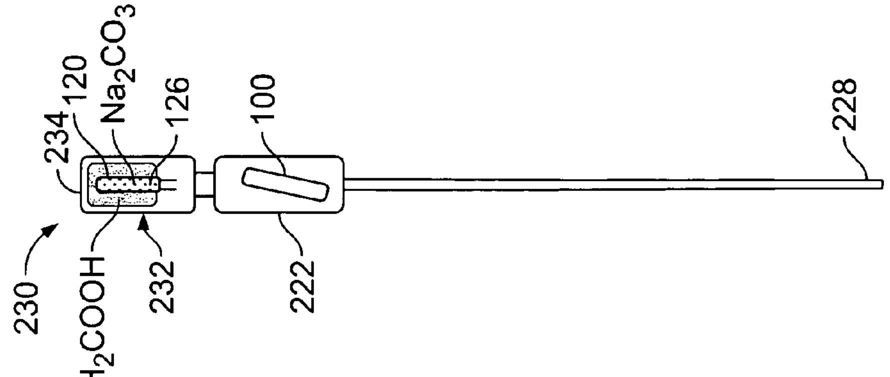
FIG. 13 is a schematic diagram of a metering pipette.

Referring to FIG. 13, another example of a metering pipette 230 includes a vacuum pump 222 and a gas pump 232. The vacuum, pump 222 is similar to that shown in FIG. 12. The gas pump 232 includes a glass capillary 120 filled with $Na_2CO_3$ and placed in a pipette bulb 234 containing $CH_2COOH$. When the glass capillary 120 is broken, $Na_2CO_3$ interacts with $CH_2COOH$ to generate $CO_2$, increasing the gas pressure in the bulb 234. The vacuum pump 222 allows the user to quickly draw a predetermined amount of a fluid into the pipette 230. The gas pump 232 allows the user to dispense the fluid out of the pipette 230.

An advantage of using the gas pump 232 is that the fluid in the tube 228 can be dispensed over a controlled period of time as the $CO_2$ gas is generated from the reaction between $Na_2CO_3$ and $CH_2COOH$. This way, the user does not have to carefully monitor the output flow of the fluid when, dispensing the fluid.

Figure 14A:
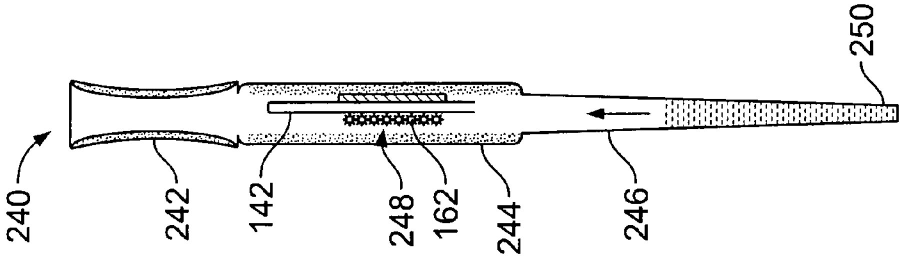
FIGS. 14A to 14C are schematic diagrams of a metering pipette.

Referring to FIG. 14A, another example of a metering pipette 240 includes a bulb 242, a middle section 244, and a pipette tube 246. The middle section 244 is constructed of a deformable material. An on-off-on valve 248 is positioned in the middle section 244. The on-off-on valve 248 includes a glass capillary 142 and SAP 162 positioned outside of the capillary 142, similar to the device shown in FIGS. 9A to 9C.

Referring to FIG. 14A to use the pipette 240, the user squeezes and releases the bulb 242 to draw a fluid into the tube 246 and the middle section 244.

Figure 14B:
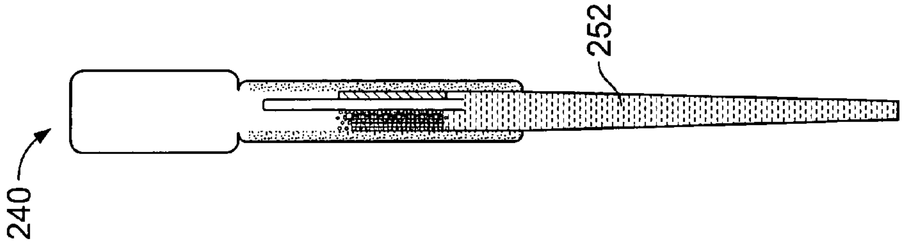

Referring to FIG. 14B, when the fluid reaches the middle section 244 and comes into contact with the SAP 162, a portion of the fluid is absorbed by the SAP 162, causing the SAP 162 to expand in volume and block passage of the fluid beyond the SAP 162. This way, a predetermined amount of fluid is drawn into the pipette 240.

Figure 14C:
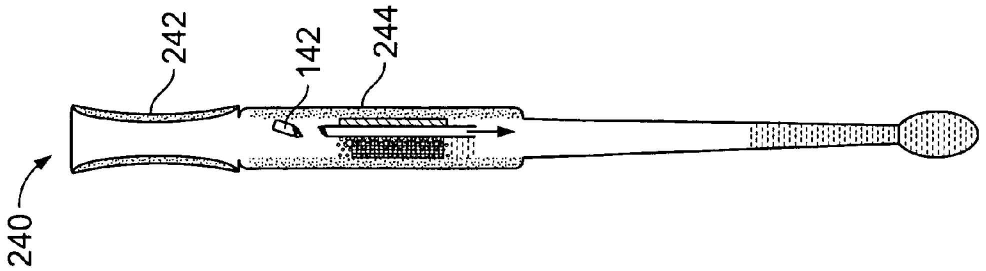

Referring to FIG. 14C, to dispense the fluid from the pipette 240, the user presses the middle section 244 (which is made of deformable material) to break the glass capillary 142, forming a passage through the broken capillary 142. The user then squeezes the bulb 242 to force the fluid out of the pipette 240.

When a batch of pipettes 240 are manufactured, the size of the tube 246 and the middle section 244, and the position of the on-off-on valves 248 within the middle section 244 are the same, so that users can use the pipettes 240 to quickly draw in substantially the same amounts of fluids without closely monitoring the levels of liquids in the pipettes 240.

Figure 15A:
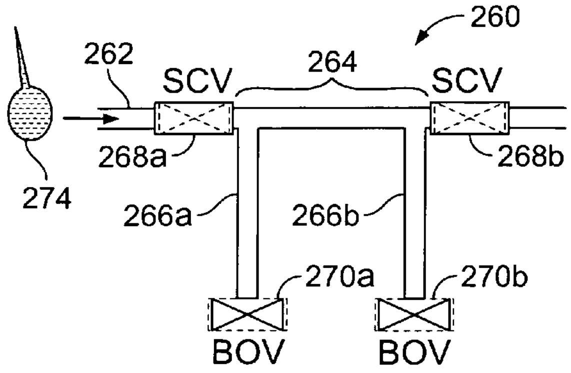
FIGS. 15A and 15B are schematic diagrams of a metering device.

Referring to FIG. 15A, a metering device 260 for collecting a predetermined amount of fluid includes a glass capillary 262 having two branches 266*a* and 266*b*, two self-close valves 268*a* and 268*b*, and two broken open valves 270*a* and 270*b*. Each of the self-close valves 268*a* and 268*b* has SAP that expands upon absorption of fluids. Initially, the self-close valves 268*a* and 268*b* are in the open state, and the broken open valves 270*a* and 270*b* are in the closed state. The self-close valves 268*a* and 268*b* can be similar to those shown in FIGS. 6A to 8C. The broken open valves 270*a* and 270*b* can be similar to those shown in FIGS. 5A and 5B.

Figure 15B:
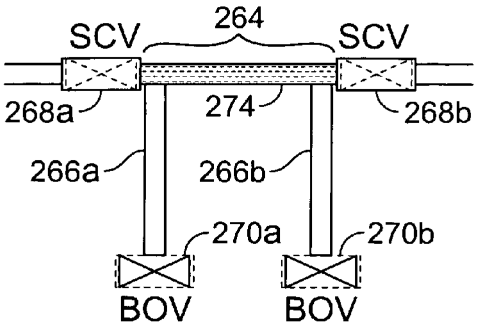

In operation, a fluid 274 is drawn into the capillary 262 due to a capillary force, and flows past the self-close valves 268*a* and 268*b*. Referring to FIG. 15B, as the fluid 274 flows pass the self-close valves 268*a* and 268*b*, a portion of the fluid 274 is absorbed by the SAP in the self-close valves 268*a* and 268*b*, causing the self-close valves 268*a* and 268*b* to change to the closed state, blocking further passage of the fluid 274. This results in the fluid 274 occupying a segment 264 of the capillary between the self-close valves 268*a* and 268*b*.

The fluid 274 can be moved from the segment 264 to other locations through the branch 266*a* or 266*b* by changing the broken open valves 270*a* and 270*b* from the closed state to the open state, and applying a suction force or a push force to move the fluid 274.

An advantage of the metering device 260 is that it can quickly sample a predetermined volume of fluid without careful monitor by the user. Because the capillaries of the metering device 260 have small diameters, the metering device 260 is useful in precisely sampling small amounts of fluid.

Figure 16A:
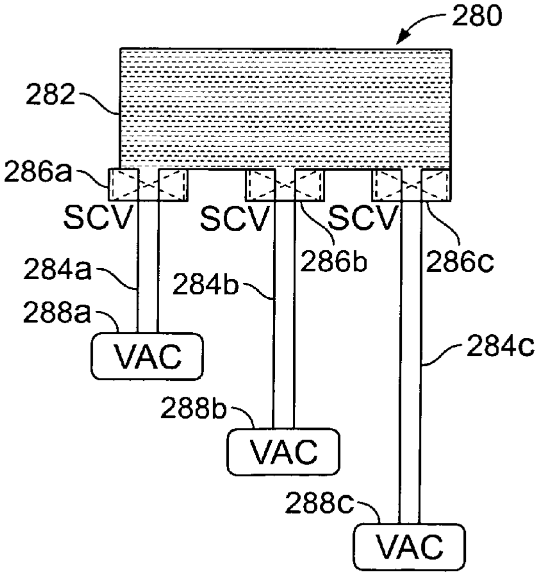
FIGS. 16A and 16B are schematic diagrams of a metering device.

Referring to FIG. 16A, a metering device 280 that can obtain three different amounts of fluids from a sample well 282 includes three capillaries 284*a*, 284*b*, and 284*c*. Each capillary has a self-close valve (e.g., 286*a*, 286*b*, or 286*c*) at one end and a vacuum valve (e.g., 288*a*, 288*b*, or 288*c*) at the other end. Each vacuum pump has a vacuum glass capillary. Initially, the self-close valves are in the open state.

Figure 16B:
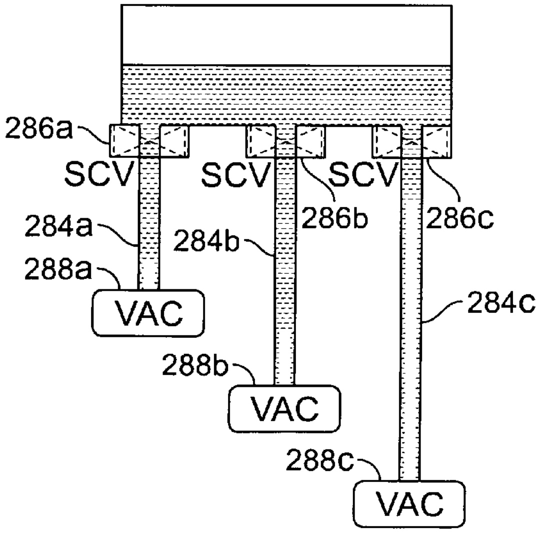

Referring to FIG. 16B, when the user breaks the vacuum glass capillary in the vacuum pumps 288*a*, a suction force is generated to draw a predefined amount of liquid into the capillary 284*a*. As the fluid passes the self-close valve 286*a*, the SAP in the self-close valve 286*a* expands, causing the self-close valve 286*a* to enter the closed state, preventing further movement of the fluid through the self-close valve 286*a*. Similarly, predefined amounts of fluid can be drawn into the capillaries 284*b* and 284*c* by breaking the vacuum capillaries in the vacuum pumps 288*b* and 288*c*. The amounts of fluid drawn into the capillaries 284*a* to 284*c* are determined by the volumes of the capillaries in the vacuum pumps 288*a* to 288*c*, which can be the same or different.

Figures 17A, 17B, 17C:
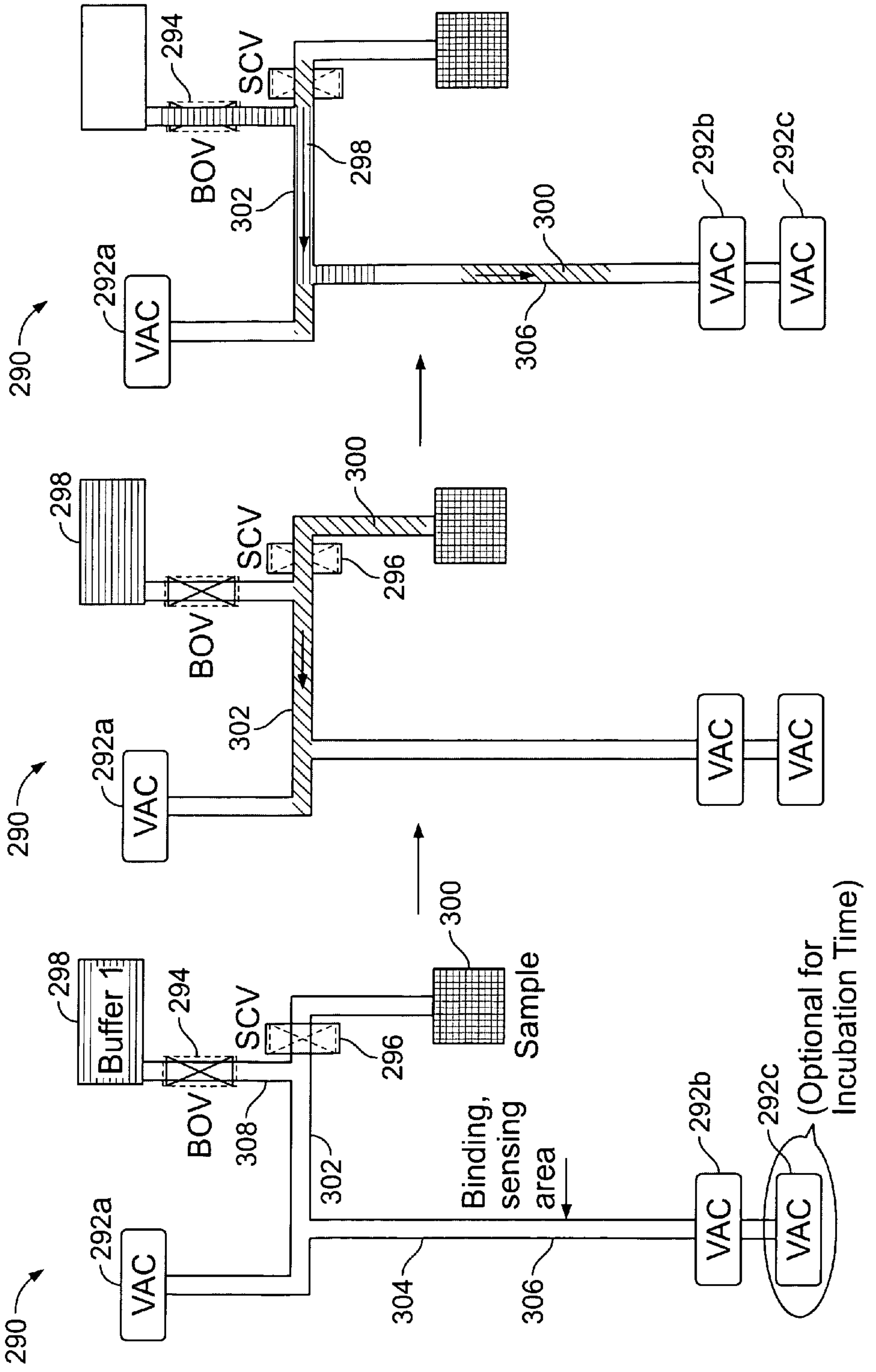
FIGS. 17A to 17C are schematic diagrams of a device for use in a two-step assay.

Referring to FIG. 17A, a device 290 for use in a two-step assay that requires rapid binding of reagents followed by washing with a buffer can be fabricated using a combination of vacuum pumps, a broken-open valve, and a self-close valve. A channel 302 has one end coupled to a sample well containing a sample 300 through a self-close valve 296, and another end coupled to a first vacuum pump 292*a*. The channel 302 is connected to a channel 308, which is coupled to a buffer 298 through a broken-open valve 294. The channel 302 is also connected to a channel 304, which is coupled to a second vacuum pump 292*b* and a third vacuum pump 292*c*. The channel 304 includes a binding and/or sensing area 306 that includes reagents for binding or sensing compounds in the sample 300.

The device 290 is operated in a way such that the sample 300 is drawn towards the binding and sensing area 306 to cause a reaction to occur, then the buffer 298 is drawn towards the binding and sensing area 306 to wash the binding and sensing area 306.

Referring to FIG. 17B, the vacuum pump 292*a* is activated to generate a suction force that draws the sample 300 towards the vacuum pump 292*a* and into the section of the channel 302 between the vacuum pump 292*a* and the self-close valve 296. As the sample 300 flows past the self-close valve 296, a portion of the sample is absorbed by the SAP in the self-close valve 296, causing the self-close valve 296 to enter the closed state.

Referring to FIG. 17C, the broken-open valve 294 is activated to cause the valve 294 to change to the open state. The vacuum pump 292*b* is activated to generate a suction force that draws both the sample 300 and the buffer 298 towards the vacuum pump 292*b*. The vacuum pumps 292*a* and 292*b* are designed such that after the pumps are activated, the sample 300 will stop at the binding and sensing area 306. After a period of time, the vacuum pump 292*c* is activated to move the sample 300 out of the area 306, and cause the buffer 298 to flow through and wash the area 306.

The example above provides incubation time that allows the compounds in the sample 300 to react with the reagents in the binding and sensing area 306 before the area 306 is washed by the buffer 290. If the reactions at the area 306 is fast and incubation time is not necessary, then the vacuum, pump 292*b* can be made larger and the vacuum pump 292*c* can be omitted. When the vacuum pump 292*b* is activated, the sample rapidly flows pass the binding and sensing area 306, followed by washing by the buffer 298.

Figures 18A, 18B, 18C:
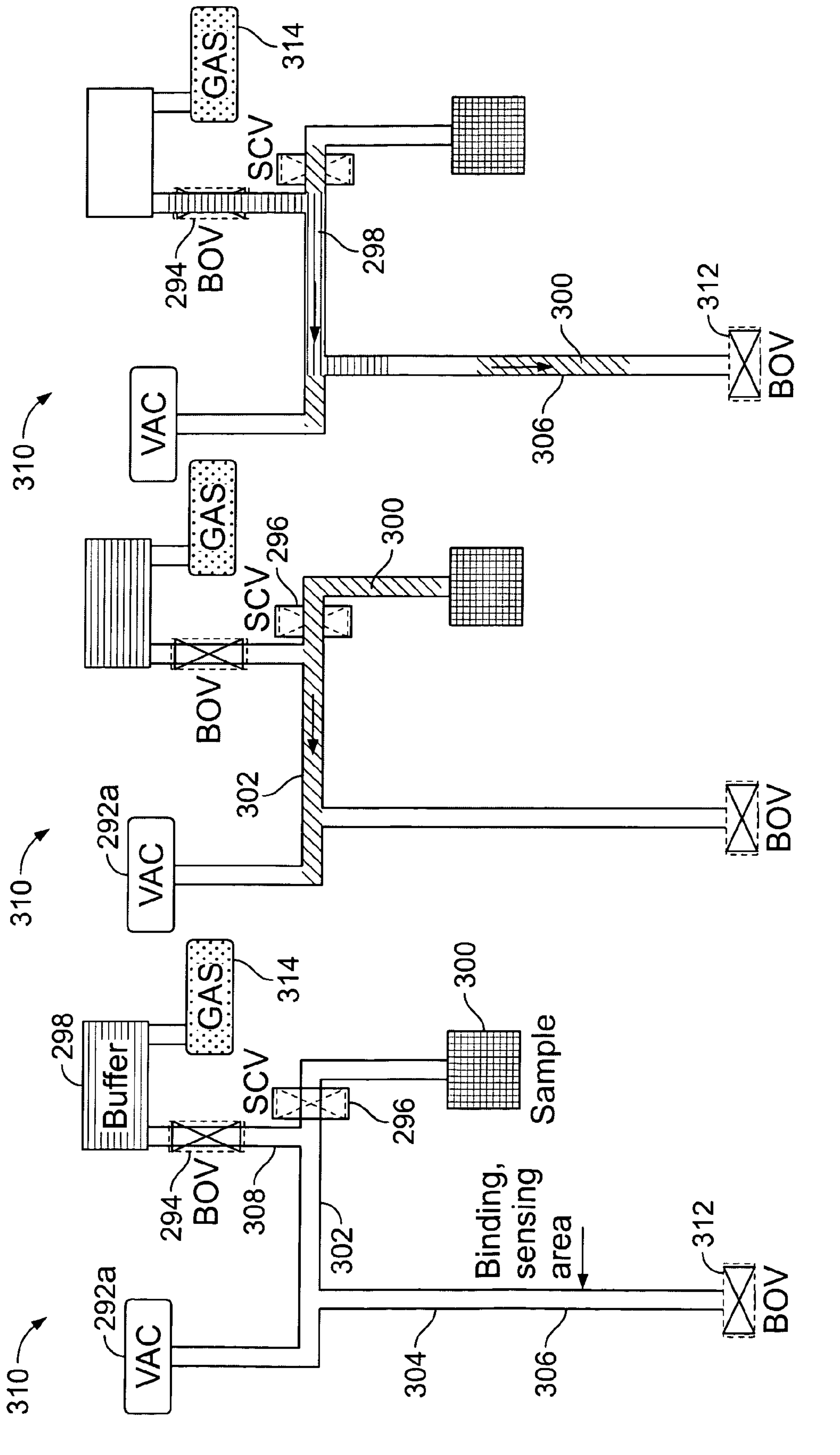
FIGS. 18A to 18C are schematic diagrams of a device for use in a two-step assay.

Referring to FIG. 18A, a device 310 for use in a two-step assay that requires slow binding of reagents followed by washing with a buffer can be fabricated using a combination of a vacuum pump, broken-open valves, a self-close valve, and a gas pump. The device 310, similar to the device 290, has a channel 302 connected to two channels 304 and 308. The channel 302 is coupled to a sample 300 through a self-close valve 296. The channel 308 is coupled to a buffer 298 through a broken-open valve 294. The channel 304 includes a binding and sensing area 306. One end of the channel 304 is coupled to a broken-open valve 312. A gas pump 314 is coupled to the buffer 298.

The difference between the device 310 and the device 290 is that, in device 310, rather than using the vacuum pump 292*b* to draw the sample 300 and buffer 298 towards the binding and sensing area 306, the gas pump 314 is used to push the sample 300 and the buffer 298 towards the area 306.

Referring to FIG. 18B, to perform the two-step assay, the vacuum pump 292*a* is activated to draw the sample 300 into the channel. The self-close valve 296 enters a closed state after the sample flows pass the valve 296.

Referring to FIG. 18C, the broken-open valves 294 and 312 are activated to cause the valves to change to the open state. The gas pump 314 is activated to generate gas over a period of time, pushing the sample 300 and the buffer 298 through the binding and sensing area 306. Because the gas pump 314 generates gas over a period time (the reaction between, compounds that generate gas takes a certain amount of time to complete), the sample 300 can pass the binding and sensing area 306 slowly, allowing slow binding reactions to occur.

Figures 19A, 19B, 19C:
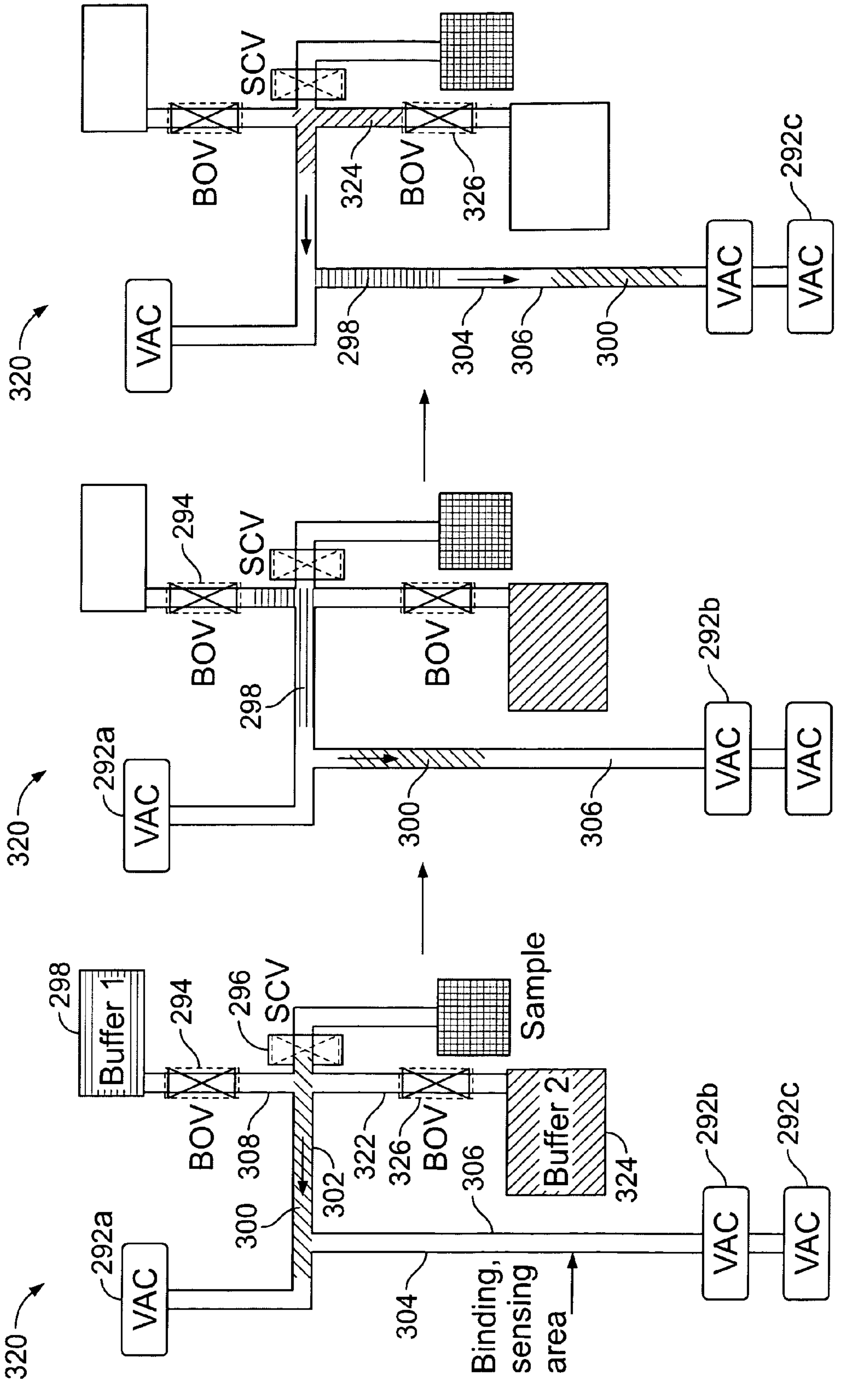
FIGS. 19A to 19C are schematic diagrams of a device for use in a three-step assay.

Referring to FIG. 19A, a device 320 for use in a three-step assay that requires rapid binding of reagents followed by washing with two buffers can be constructed by adding a second buffer 324, and a channel 322 to the structure show in FIG. 17A. To perform the multi-step assay, the vacuum pump 292*a* is activated to cause the sample 300 to flow to the channel 302. As the sample 300 flows past the self-close valve 296, the valve 296 changes to a closed state.

Referring to FIG. 19B, the broken-open valve 294 is activated so that it changes to an open state, and the vacuum pump 292*b* is activated to cause the sample 300 and the first buffer 298 to be drawn toward the binding and sensing area 306.

Referring to FIG. 19C, the broken-open valve 326 is activated so that it changes to an open state, and the vacuum pump 292*c* is activated to cause the sample 300, the first buffer 298, and the second buffer 324 to be drawn towards the binding and sensing area 306. This way, the reaction at the area 306 can he washed by two different buffers.

A device for use in assays that require more than three steps can be constructed by coupling additional buffers or samples, and adding a corresponding number of vacuum pumps to the end of the channel 304.

Figure 20:
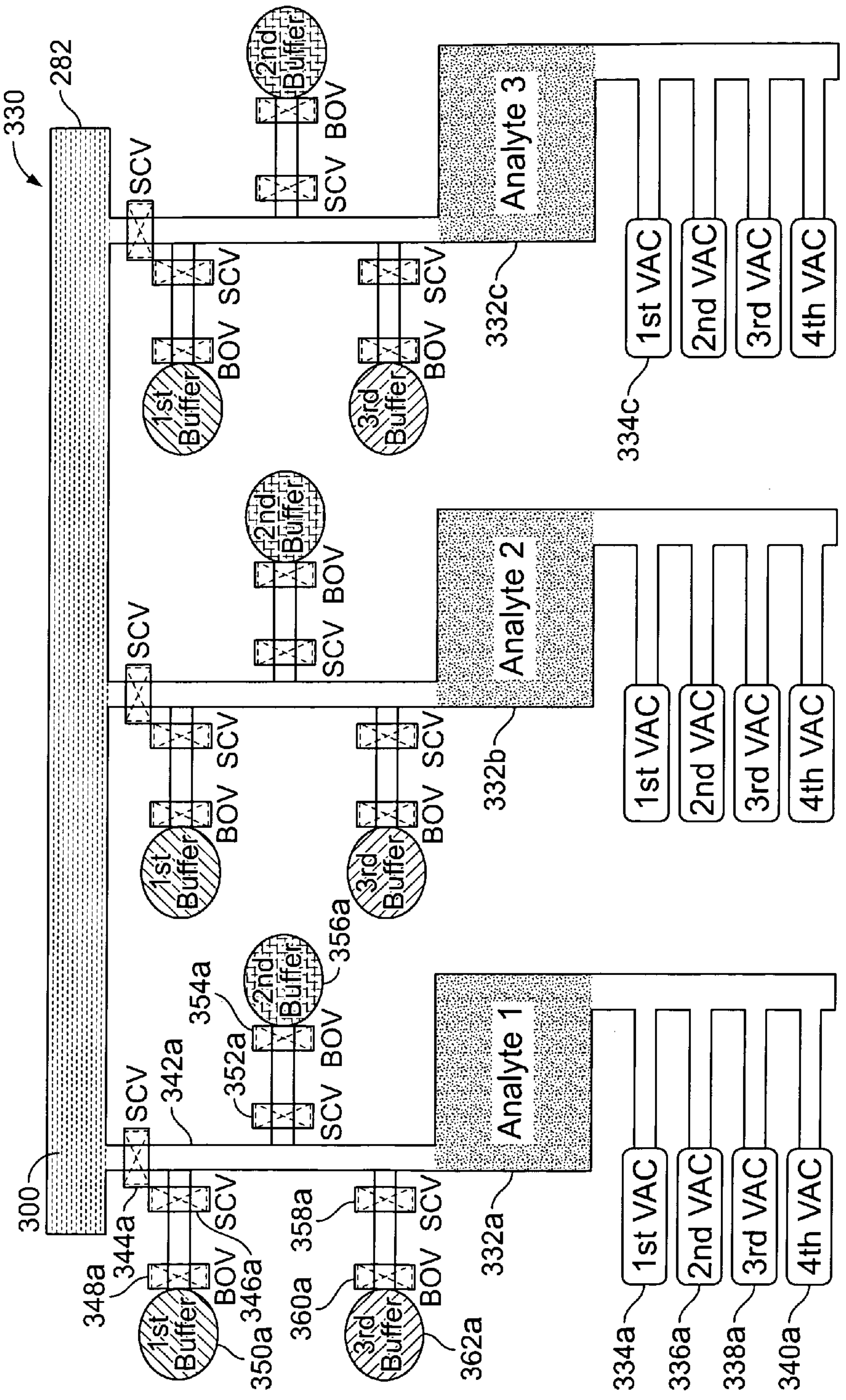
FIG. 20 is a schematic diagram of a module for use in a multiplex analyte assay.

Referring to FIG. 20, a module 330 can be constructed to perform multiplex analyte assay. The module 330 includes a sample well 282 for holding a sample 300 and three chambers 332*a*, 332*b*, and 332*c*, each containing an analyte for binding and sensing compounds in the sample 300. Below is a description of the components used to perform an assay concerning the first analyte in the chamber 332*a*.

The chamber 332*a* is coupled to the sample well 282 through a channel 342*a* and a self-close valve 344*a*. The channel 342*a* is coupled to a first buffer 350*a* through a self-close valve 346*a* and a broken-open valve 348*a*. The channel 342*a* is coupled to a second buffer 356*a* through a self-close valve 352*a* and a broken-open valve 354*a*. The channel 342*a* is coupled to a third buffer 362*a* through a self-close valve 358*a* and a broken-open valve 360*a*. The chamber 332*a* is also connected to vacuum pumps 334*a*, 336*a*, 338*a*, and 340*a*.

To perform the assay, the vacuum pump 334*a* is activated to draw the sample 300 towards the chamber 332*a* to allow the compounds in the sample 300 to react with the first analyte in the chamber 332*a*. After a certain amount of the sample flows through the self-close valve 344*a*, the valve 344*a* changes to the closed state. The first buffer 350*a* is flushed through the chamber 332*a* by activating the broken-open valve 348*a* (to change the valve to the open state) and the second vacuum pump 336*a*. After a certain amount of the first buffer 350*a* flows past the self-close valve 346*a*, the valve 346*a* changes to a closed state.

The second buffer 356*a* is flushed through the chamber 332*a* by activating the broken-open valve 354*a* (to change the valve to the open state) and the third vacuum pump 338*a*. After a certain amount of the second buffer 356*a* flows past the self-close valve 352*a*, the valve 352*a* changes to a closed state.

In a similar manner, the third buffer 362*a* is flushed through the chamber 332*a* by activating the broken-open valve 360*a* (to change the valve to the open slate) and the fourth vacuum pump 340*a*. After a certain amount of the third buffer 362*a* flows past the self-close valve 358*a*, the valve 358*a* changes to a closed state.

The assays concerning the second and third analytes in the chambers 332*b* and 332*c* can be performed similar to the manner that the assay concerning the first analyte in the chamber 332*a* is performed. The assays concerning the first, second, and third analytes in the chambers 332*a*, 332*b*, and 332*c* can be performed simultaneously.

The following are applications of the vacuum pumps and gas pumps in performing biological assays.

Figure 22A:
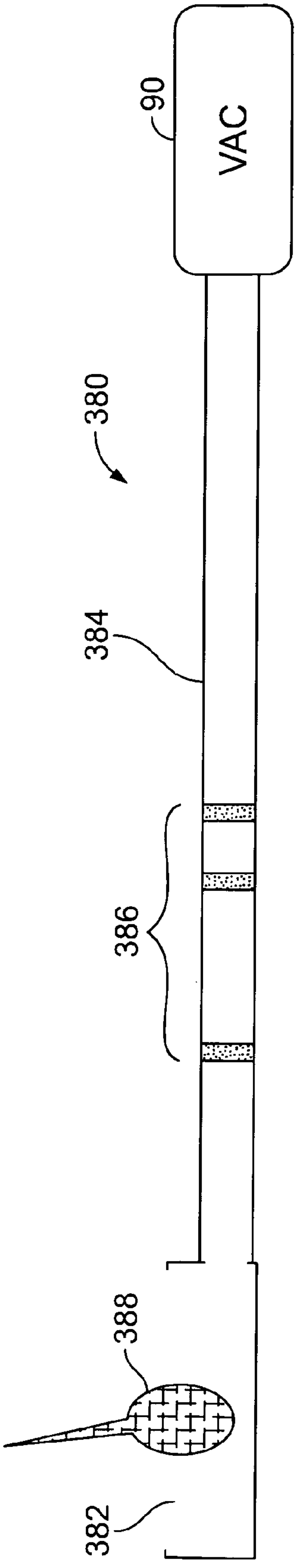
FIGS. 22A and 22B are schematic diagrams of a device for performing rapid reaction colorimetric assay.
Figure 22B:
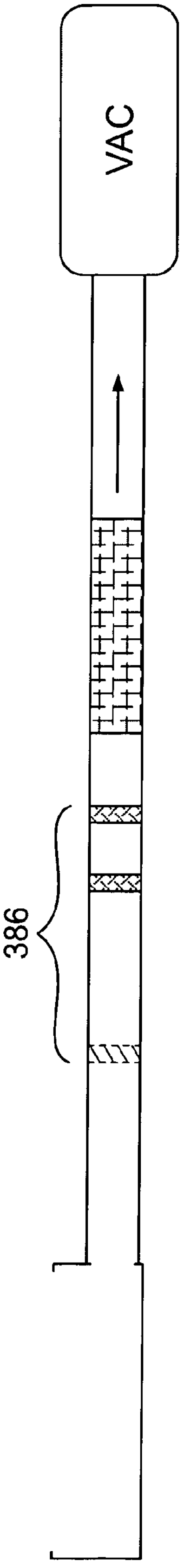

FIGS. 22A and 22B show a device 380 for performing rapid reaction colormetric assay. The device 380 includes a channel 384 coupled to a sample well 382 at one end and coupled to a vacuum pump 90 at the other end. The sample well 382 can hold a sample fluid 388, such as blood or urine. The channel 384 includes a testing area 386 having test lines that change color upon detection of certain compounds. The vacuum pump 90 when activated can quickly draw the fluid in the sample well 382 through the testing area 386. By reading the color of the test lines, a user can quickly determine the existence or non-existence of certain compounds in the fluid.

Figure 23A:
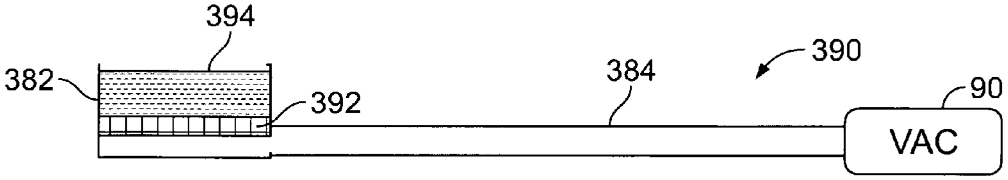
FIGS. 23A and 23B are schematic diagrams of a device for sampling a filtered fluid.
Figure 23B:
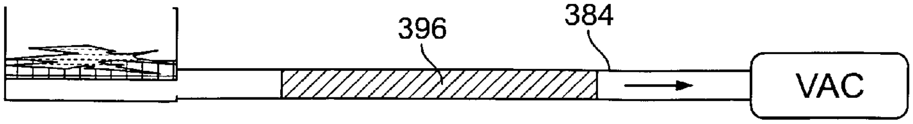

FIGS. 23A and 23B show a device 390 for sampling a filtered fluid. The device 390 includes a channel 384 that has one end coupled to a sample well 382 and another end coupled to a vacuum pump 90. A filter membrane 392 is placed in the sample well 382. The vacuum pump 90 when activated can quickly draw a fluid 394 (e.g., blood) in the sample well 382 through the filter membrane 392, producing a filtered fluid 396 (e.g., plasma) that is drawn into the channel 384.

Figures 24A, 24B, 24C:
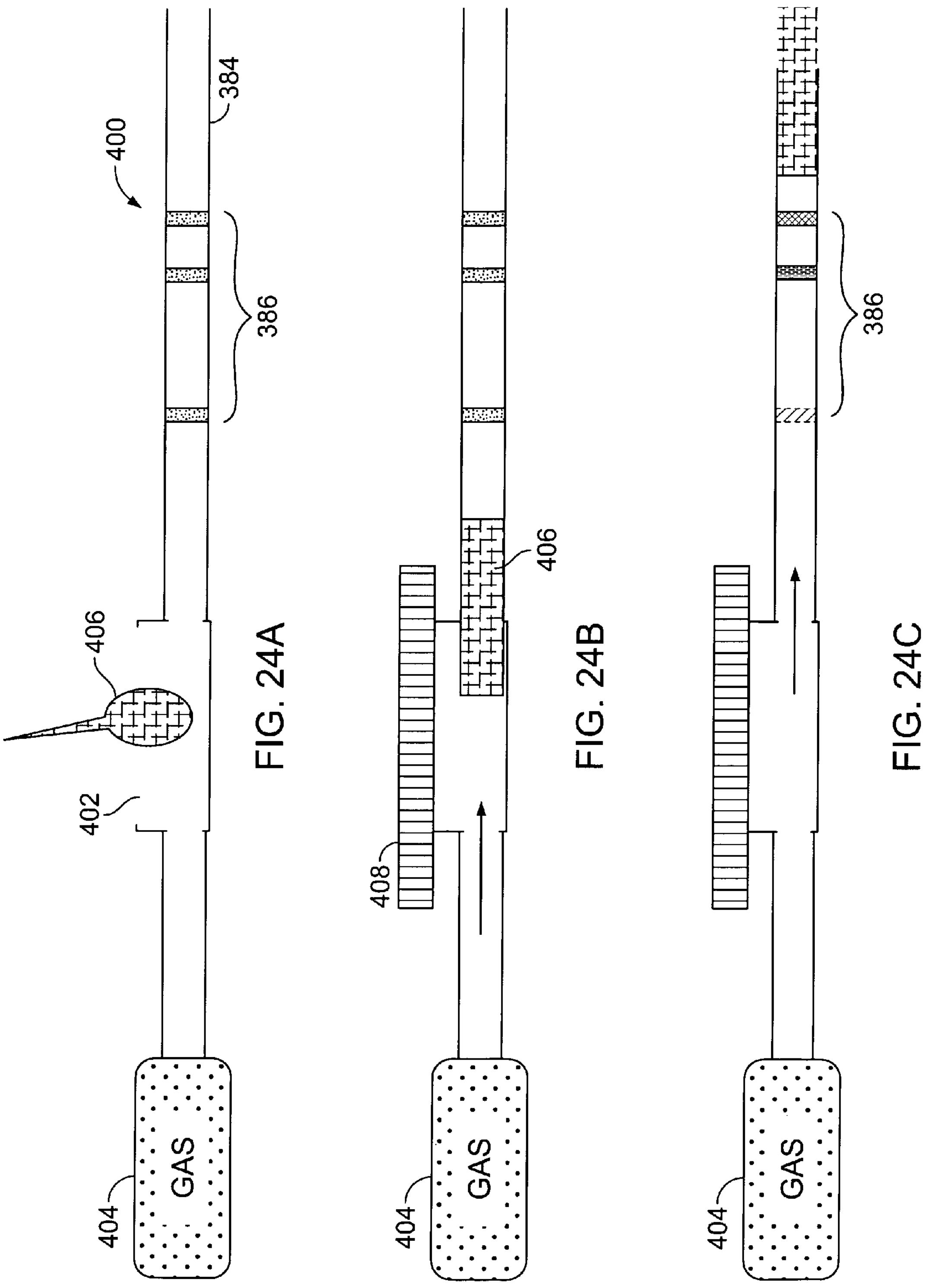
FIGS. 24A to 24C are schematic diagrams of a device for performing a slow colorimetric assay.

FIGS. 24A to 24C show a device 400 for performing a slow colorimetric assay. Referring to FIG. 24A, the device 400 includes a sample well 402 coupled between a gas pump 404 and a channel 384. The channel 384 has a test area 386 having lest lines that change color upon detection of certain compounds. To use the device 400, a sample fluid 406 is placed in the sample well 402. Referring to FIG. 24B, a sealing tape 408 seals the opening of the sample well 402. Referring to FIG. 24C, the gas pump 404 is activated to generate gas that pushes the sample fluid 406 through the test area 386. Because the gas pump 404 generates gas over a period of time, the sample fluid 406 travels through the test area over a period of time, allowing a slow colorimetric assay to be performed.

Figure 29B:
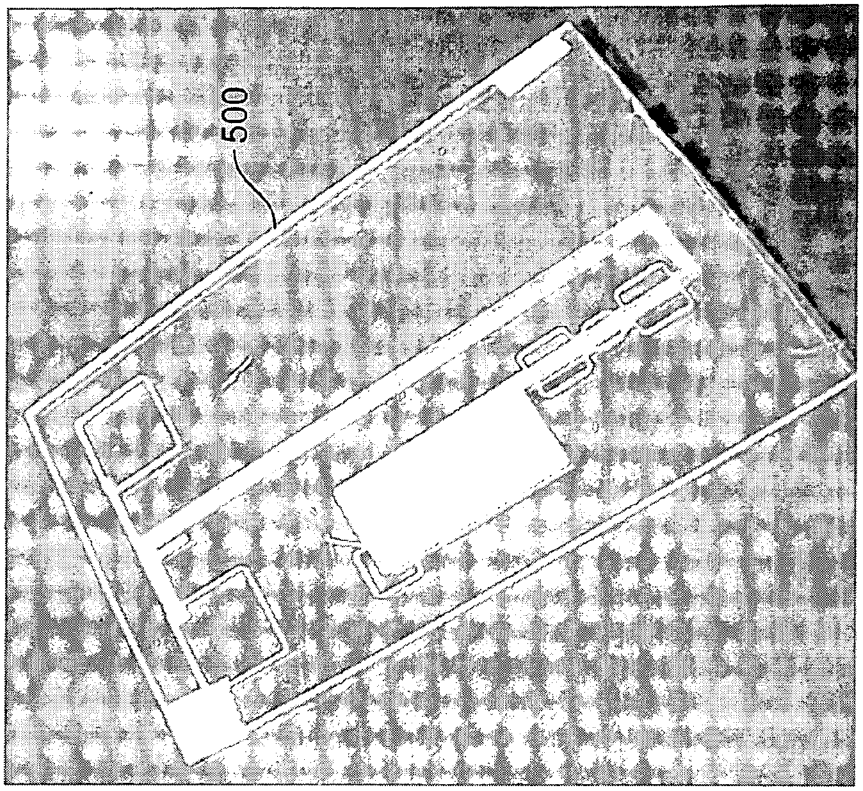
FIGS. 29A and 29B are a diagram and a photograph, respectively, of a device for performing an immunoassay.
Figure 29A:
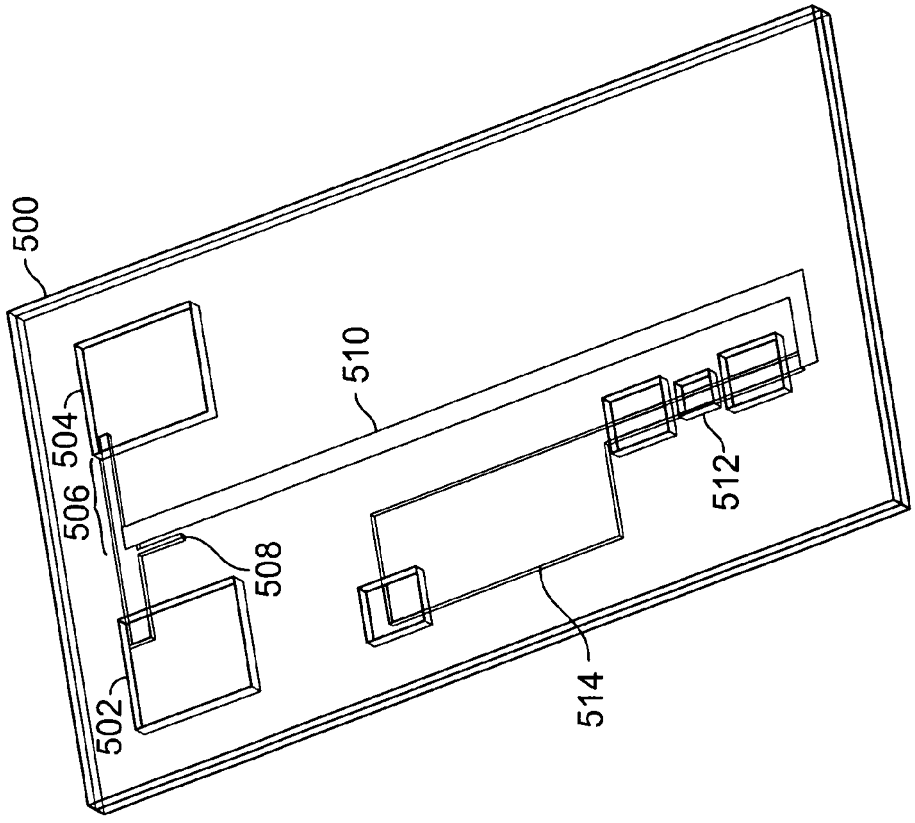

FIGS. 29A and 29B show a diagram and a photograph, respectively, of an example of a device 500 for performing an immunoassay. The device 500 includes a blood sample well 502, a washing buffer well 504, a metering zone 508 with labeled antibody (Ab*), a self-close valve 508, a diagnostic zone 510 having an antibody array, a broken open valve 512, and a waste well 514. The main body of the device 500 can be made of, e.g., glass or plastic. The self-close valve 508 can be filled with SAP that, upon contact with a fluid, expands to close off the capillary adjacent to the self-close valve 508.

Figure 30C:
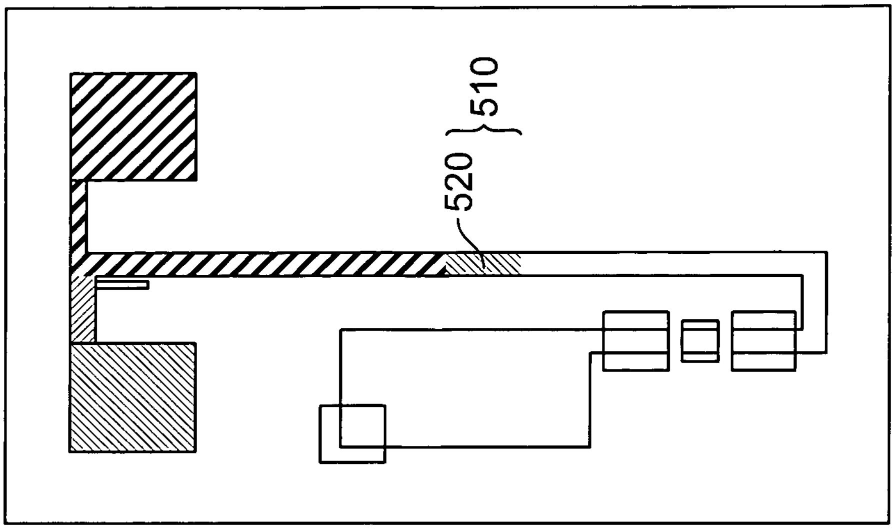
FIGS. 30A to 30C are diagrams showing steps for performing the immunoassay using the device of FIG. 29A.
Figure 30B:
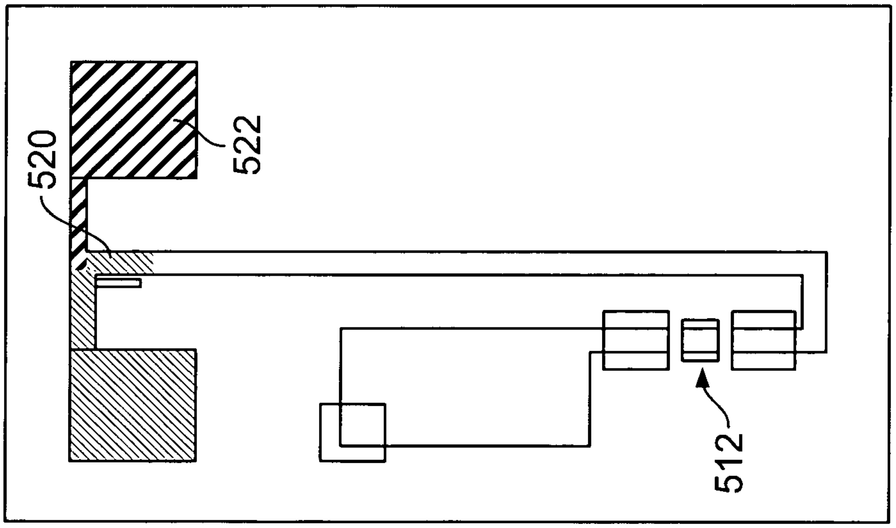
Figure 30A:
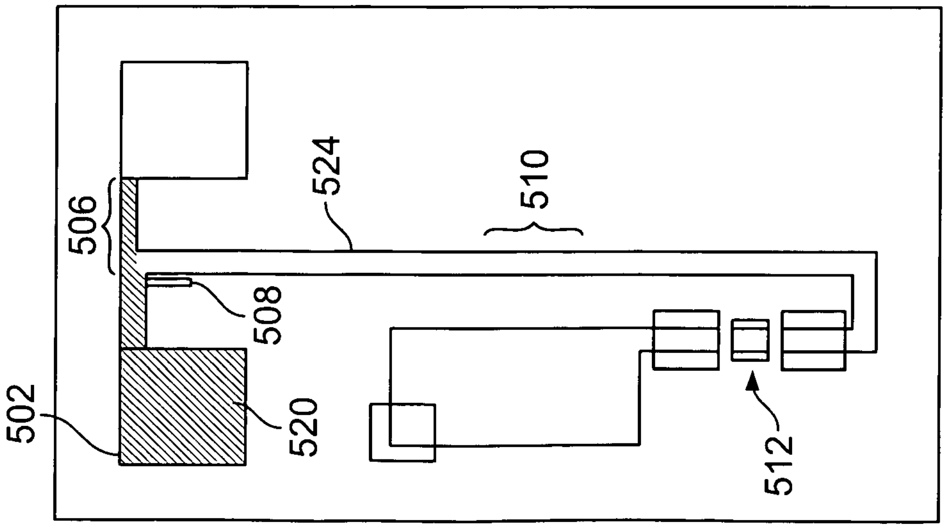

Referring to FIG. 30A, an immunoassay can be performed by placing a blood sample 520 in the sample well 502. Some of the blood is drawn to the metering zone 508 by capillary force and mixed with the labeled antibody (Ab*). Some of the blood is absorbed by the SAP in the self-close valve 508, causing the SAP to expand in volume to block the capillary and prevent additional blood from entering the metering zone 508. This way, a controlled amount of blood sample can be obtained in the metering zone 508. Initially, the broken open valve 512 is closed, so that the blood enters the capillary of the metering zone 506 and does not enter the capillary 524 that is coupled to the diagnostic zone 510.

Referring to FIG. 30B, after about 30 to 60 seconds to allow the blood sample 520 to have sufficient time to mix with the labeled antibody (Ab*), a washing buffer 522 is loaded to the washing buffer well 504. The broken open valve 512 is activated and switches to an open state. The metered blood sample 520 and the washing buffer 522 are drawn to the capillary 510 due to capillary force.

Referring to FIG. 30C, the blood sample 520 enters the diagnostic zone 510. If the blood sample 520 has one or more particular types of antigen (Ag) that match the antibody (Ab) in the diagnostic zone 510, binding of antigen (Ag), antibody (Ab), and the labeled antibody (Ab*) will occur. Afterwards, the blood sample 520 and unbound molecules are washed away by the washing buffer 522. The labeled antibody (Ab*) bound to the diagnostic zone 510 can then be read by an optical reader.

The device 500 provides a simple way to determine whether the blood sample has certain types of antigen, such as cardiac markers, myoglobin, CK-MB, and troponin I, heart failure markers B-type natriuretic peptide (BNP), inflammatory marker C-reactive protein (CRP), etc. The device 500 can be used for qualitative, semi-quantitative, and quantitative determinations of one or multiple analytes in a single test format. The device 500 can be used to perform, e.g., fluorescence-linked immunosorbent assay (FLISA), enzyme-linked immunosorbent assay (ELISA), sol particle, and other assay formats, and is suitable for simultaneous multiple analyte assays.

Figure 31:
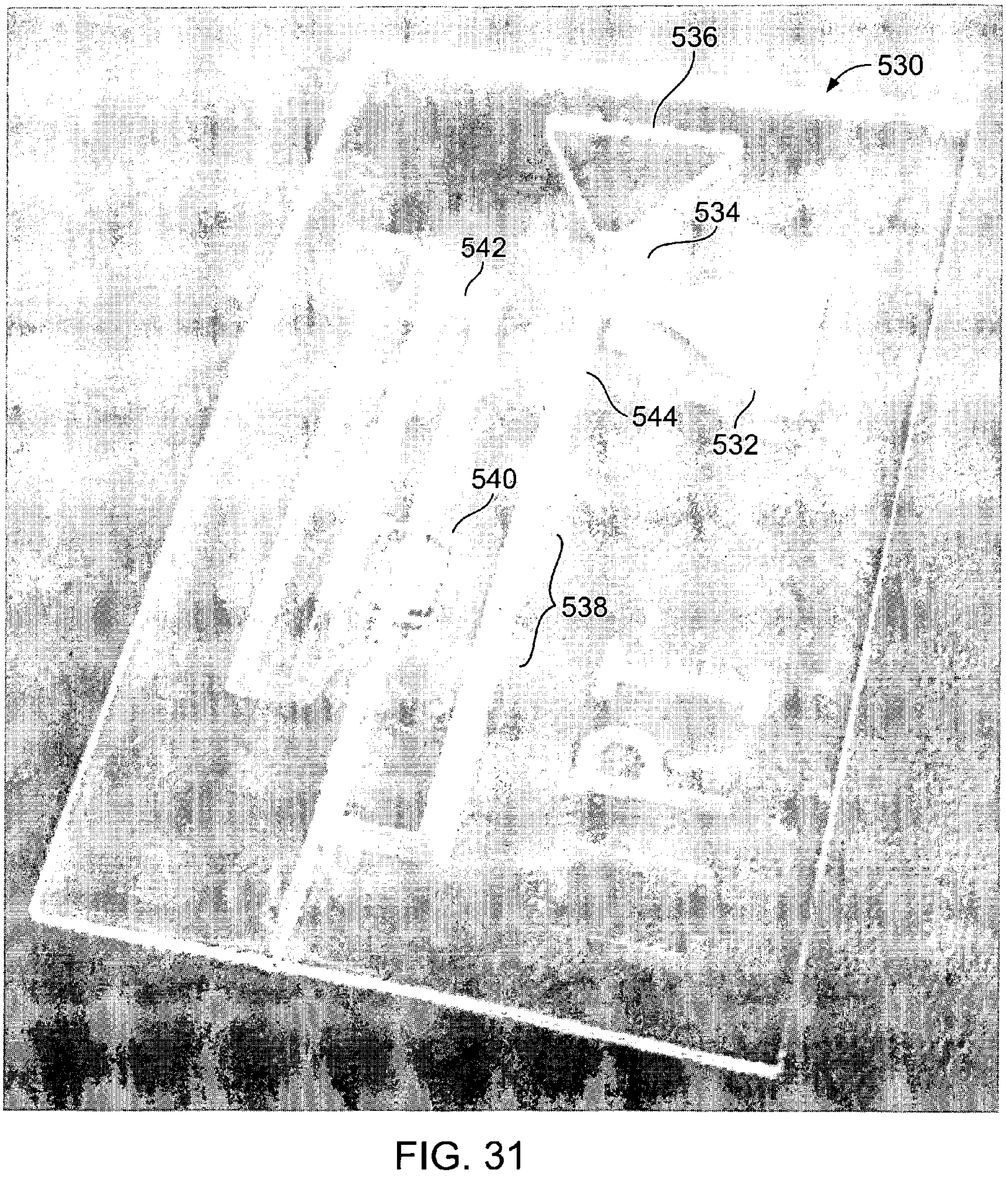
FIG. 31 is a photograph of a device for performing an immunoassay.

FIG. 31 is a photograph of another example of a device 530 for performing an immunoassay. The device 530 includes a blood sample well 532, a self-close valve 534, a washing buffer well 536, a diagnostic zone 538, a broken open valve 540, and a waste zone 542. Initially, a blood sample is loaded to the blood sample well 532. The blood is drawn to a capillary 544 coupled to the diagnostic zone 538 by capillary force. The blood sample well 532 includes a blood cell removal membrane, so that only blood plasma passes the membrane and enters the capillary 544. A portion of the blood plasma is absorbed by the SAP in the self close valve 534, causing the valve 534 to enter a closed state, preventing additional blood plasma from entering the capillary 544. This allows a controlled volume of blood plasma to be obtained.

A washing buffer is loaded to the washing buffer zone 536. The broken open valve 540 is activated and switches to an open state. The blood plasma and the washing buffer are drawn to the diagnostic zone 538 due to capillary force. The diagnostic zone 538 has an array of antibody molecules. If the blood plasma has one or more particular types of antigen that matches one or more of the antibody in the diagnostic zone 538, binding of antigen and antibody will occur. The blood plasma and the non-binding molecules are washed away by the washing buffer. The bound molecules in the diagnostic zone 538 can be read by an optical sensor.

The device 530 provides a simple way to determine whether the blood sample has certain types of antigen, such as cardiac markers, myoglobin, CK-MB, and troponin I, heart failure markers B-type natriuretic peptide (BNP), inflammatory marker C-reactive protein (CRP), etc. The device 530 can be used for qualitative, semi-quantitative, and quantitative determinations of one or multiple analytes in a single test format. The device 530 can be used to perform fluorescence-linked immunosorbent assay (FLISA), enzyme-linked immunosorbent assay(ELISA), sol particle and other assay formats, and is suitable for simultaneous multiple analyte assays.

Although some examples have been discussed above, other implementations and applications are also within the scope of the following claims. For example, in the vacuum pump 90 of FIGS. 1A and 1B, the container 100 can container a low pressure region instead of a vacuum region. As long as the gas pressure inside the container 100 is lower than the gas pressure outside of the container 100, when the container 100 breaks, the pressure in the region 106 outside of the container 100 will drop, generating a suction force that draws fluids in a direction towards the container 100. The glass capillaries described above can be replaced by capillaries made of other brittle materials, such as brittle plastic, quartz, and ceramic.

What is claimed is:

1. A fluidic device comprising:

a first material defining a first region;

a second material defining a second region that is separated from the first region; and a connector coupled between the first region and the second region, both of a first channel or of a first and second channel respectively, the connector comprising a brittle material and having an open end and a closed end, the open end being disposed in the second region, the closed end being disposed in the first region the connector configured such that when the closed end of the connector is broken, the connector defines a passage from the first region to the second region, whereby the connector comprises a material having a volume that does not block a passage of a fluid prior to absorption of the fluid, wherein the material expands in volume upon absorption of a portion of the fluid such that, after expansion, the material blocks passage of additional fluid through the connector.

2. The fluidic device of claim 1 wherein the first region comprises a channel and a reservoir, the channel configured to draw fluid from the reservoir into the channel due to a capillary force after the connector is broken.

3. The fluidic device of claim 1 wherein the connector comprises an outer perimeter having a portion that has a flat surface, and an inner perimeter having a portion that has a flat surface, to allow light to illuminate a fluid in the connector.

4. The fluidic device of claim 1 wherein the first material comprises a flexible material that allows application of an external force to break the closed end of the connector.

5. The fluidic device of claim 1, further comprising:

a self-close valve comprising a third material disposed in the first channel outside the connector, the third material having a volume that does not block a passage of a fluid prior to absorption of the fluid, wherein the third material expands in volume upon absorption of a portion of the fluid such that, after expansion, the third material blocks passage of additional fluid through the channel, wherein the closed-end of the connector prevents passage of the fluid through the connector when intact and allows passage of the fluid through the connector when broken.

6. The fluidic device of claim 5 wherein the third material comprises superabsorbent polymers.

7. The fluidic device of claim 5 wherein the first channel comprises an expanded section having a larger diameter than adjacent portions of the first channel, and the third material is disposed in the expanded section.

8. The fluidic device of claim 5 wherein the first channel comprises a capillary, and the fluid moves in the first channel at least in part due to a capillary force.

9. The fluidic device of claim 1, further comprising a second channel, in which a part of the connector is positioned in the second channel, the second channel having a wall that comprises a flexible material that allows application of an external force to break the closed end of connector.

10. A method of using the fluidic device of claim 1, wherein the open end of the connector is positioned in the first channel and the closed end in the second channel, comprising:

breaking the closed end of the connector to form a passage from the first region to the second region through the connector;

absorbing the portion of the fluid flowing in the connector by using the material of the connector that expands in volume after absorbing the fluid; and using the expanded material of the connector to block further flow of additional fluid through the connector.

11. The method of claim 10 wherein the material of the connector comprises superabsorbent polymers.

12. A method of using the fluidic device of claim 5, wherein the connector couples the first region and the second region of the first channel, comprising:

flowing a fluid in a channel that includes a material that expands in volume upon absorption of a portion of the fluid, including flowing a first portion of the fluid past the material and using the material to absorb a second portion of the fluid, causing the material to expand in volume; and blocking passage of additional fluid through the first channel by using the expanded third material.

13. The method of claim 12, further comprising breaking the closed end of the connector to enable passage of additional fluid in the first channel by flowing the fluid through the connector to bypass the expanded third material, wherein prior to breaking the closed end, the open end of the connector is disposed in a first section of the first channel and the closed end of the connector is disposed in a second section of the first channel, the first and second sections being separated by the expanded third material.

14. The method of claim 13, further comprising absorbing another portion of the fluid flowing through the connector by using a fourth material in the connector that expands in volume after absorbing the fluid, and using the expanded fourth material to block further flow of fluid through the connector.

15. The method of claim 14 wherein the fourth material in the connector comprises superabsorbent polymers.

16. The method of claim 13 wherein the first channel having a wall that comprises a flexible material that allows application of an external force to break the closed end of the connector.

* * * * *